(12) United States Patent
Han et al.

(10) Patent No.: US 10,498,011 B2
(45) Date of Patent: Dec. 3, 2019

(54) ELECTRONIC DEVICES HAVING CLOSED-LOOP ANTENNA ADJUSTMENT CAPABILITIES

(71) Applicant: Apple Inc., Cupertino, CA (US)

(72) Inventors: Liang Han, Sunnyvale, CA (US); Matthew A. Mow, Los Altos, CA (US); Thomas E. Biedka, San Jose, CA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 15/255,770

(22) Filed: Sep. 2, 2016

(65) Prior Publication Data
US 2018/0069295 A1 Mar. 8, 2018

(51) Int. Cl.
*H01Q 1/24* (2006.01)
*H04W 52/36* (2009.01)
*H04W 52/42* (2009.01)
*H01Q 9/42* (2006.01)
*H01Q 5/328* (2015.01)
*H01Q 5/371* (2015.01)

(52) U.S. Cl.
CPC ............ *H01Q 1/243* (2013.01); *H01Q 1/245* (2013.01); *H01Q 5/328* (2015.01); *H01Q 5/371* (2015.01); *H01Q 9/42* (2013.01); *H04W 52/367* (2013.01); *H04W 52/42* (2013.01)

(58) Field of Classification Search
CPC ........ H01Q 1/243; H01Q 1/38; H01Q 9/0421; H01Q 9/30
USPC .................................. 343/702, 745, 892, 878
See application file for complete search history.

(56) References Cited

U.S. PATENT DOCUMENTS

| 8,204,446 | B2 | 6/2012 | Scheer et al. |
| 9,203,138 | B2 | 12/2015 | Bavisi et al. |
| 9,240,830 | B2 | 1/2016 | Ljung et al. |
| 9,392,558 | B2 | 7/2016 | See et al. |
| 9,557,868 | B2 | 1/2017 | Ayala Vazquez et al. |

(Continued)

FOREIGN PATENT DOCUMENTS

WO 2010083284 7/2010

OTHER PUBLICATIONS

Han et al., U.S. Appl. No. 14/980,603, filed Dec. 28, 2015.

*Primary Examiner* — Hai V Tran
*Assistant Examiner* — Collin Dawkins
(74) *Attorney, Agent, or Firm* — Treyz Law Group, P.C.; Michael H. Lyons; Tianyi He

(57) ABSTRACT

An electronic device may be provided with wireless circuitry that includes an antenna. Control circuitry may perform closed loop tuning adjustments on the antenna. For example, the control circuitry may adjust a tunable component to tune the antenna to a first tuning setting. The control circuitry may gather impedance values from the antenna while tuned to the first tuning setting and may process the impedance values to determine whether to tune the antenna to a second tuning setting. If the impedance values lie within a predetermined complex impedance region, the control circuitry may tune the antenna to the second setting. If the impedance values lie outside of the region, the control circuitry may continue to gather impedance values using the first setting. These operations may compensate for detuning of the antenna due to proximity of a user regardless of how the electronic device is held during operation.

17 Claims, 17 Drawing Sheets

(56) References Cited

U.S. PATENT DOCUMENTS

| | | |
|---|---|---|
| 2012/0214421 A1* | 8/2012 | Hoirup .................. H01Q 1/242 |
| | | 455/67.11 |
| 2013/0005278 A1 | 1/2013 | Black et al. |
| 2014/0113679 A1* | 4/2014 | Wehrmann ........... H04B 1/0458 |
| | | 455/550.1 |
| 2015/0355251 A1* | 12/2015 | Pascolini ............... G01R 29/10 |
| | | 343/703 |
| 2016/0172768 A1 | 6/2016 | Lahti et al. |
| 2017/0033460 A1 | 2/2017 | Ayala Vazquez et al. |

* cited by examiner

240

MAXIMUM TRANSMIT POWER LEVELS

| MAX POWER LEVEL | SETTING |
|---|---|
| P1 | LOWER ANTENNA HEAD POWER LEVEL |
| P2 | LOWER ANTENNA BODY POWER LEVEL |
| P3 | UPPER ANTENNA HEAD POWER LEVEL |
| P4 | UPPER ANTENNA BODY POWER LEVEL |

*FIG. 8*

ELECTRONIC DEVICES HAVING CLOSED-LOOP ANTENNA ADJUSTMENT CAPABILITIES

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, antennas are bulky. In other devices, antennas are compact, but are sensitive to the position of the antennas relative to external objects. If care is not taken, antennas may become detuned, may emit wireless signals with a power that is more or less than desired, or may otherwise not perform as expected.

It would therefore be desirable to be able to provide improved wireless circuitry for electronic devices.

SUMMARY

An electronic device may be provided with wireless circuitry. The wireless circuitry may include one or more antennas and radio-frequency transceiver circuitry. The electronic device may have a housing in which control circuitry, the radio-frequency transceiver circuitry, and other wireless circuitry are mounted. The transceiver circuitry may be used to transmit and receive radio-frequency signals using the antennas.

The control circuitry may perform closed loop antenna tuning adjustments on a given one of the antennas. The closed loop antenna tuning adjustments may be performed based on antenna impedance information gathered from the given one of the antennas. For example, the control circuitry may adjust a tunable component coupled to the antenna to tune the antenna to a first tuning setting. The first tuning setting may be, for example, a grip tuning setting that compensates for detuning of the antenna caused by the presence of a user's hand adjacent to the antenna.

The control circuitry may gather a first set of antenna impedance information (e.g., complex impedance values such as complex scattering parameter values) from the antenna while the antenna is tuned to the first tuning setting. The control circuitry may determine whether an operating environment of the electronic device has changed based on the first set of antenna impedance information.

The control circuitry may adjust the tunable component to tune the antenna to a second tuning setting (e.g., a free-space tuning setting) in response to determining that the operating environment has changed. Once tuned to the second tuning setting, the control circuitry may gather a second set of antenna impedance information from the antenna. The second set of impedance information may be used to identify subsequent changes in the operating environment of the device. The control circuitry may continue to gather antenna impedance information using the first tuning setting in response to determining that the operating environment has not changed.

While the device is in a first operating environment, the control circuitry may determine whether the operating environment has changed by identifying a complex impedance region associated with a second operating environment from calibration data stored in memory. The control circuitry may compare the gathered impedance information to the complex impedance region to determine whether the operating environment has changed. If the complex impedance information lies within the complex impedance region, then the control circuitry may identify that the operating environment has changed and a tuning adjustment may be performed. If the information lies outside of the complex impedance region, the control circuitry may identify that the operating environment has not changed.

If desired, the electronic device may include speaker components such as an ear speaker and sensor circuitry such as an accelerometer. The electronic device may include a second antenna located at an opposite end of the electronic device from the first antenna. The control circuitry may impose different maximum transmit power levels on both antennas based on whether audio signals are being played through the ear speaker and based on whether the accelerometer detects that the device is on the body of a user. The control circuitry may perform the closed loop tuning adjustments on one of the antennas when the control circuitry determines that audio is being played through the ear speaker or the device is on the body of the user. In this way, the control circuitry may actively compensate for any detuning of the antennas due to proximity of the user to the antennas while also ensuring that regulatory limits on signal absorption are satisfied, regardless of how the user holds the electronic device during operation.

BRIEF DESCRIPTION OF THE DRAWINGS

FIG. 8 is a table of illustrative maximum transmit power level settings that may be stored on an electronic device for use during wireless communications in accordance with an embodiment.

DETAILED DESCRIPTION

Figure 1:
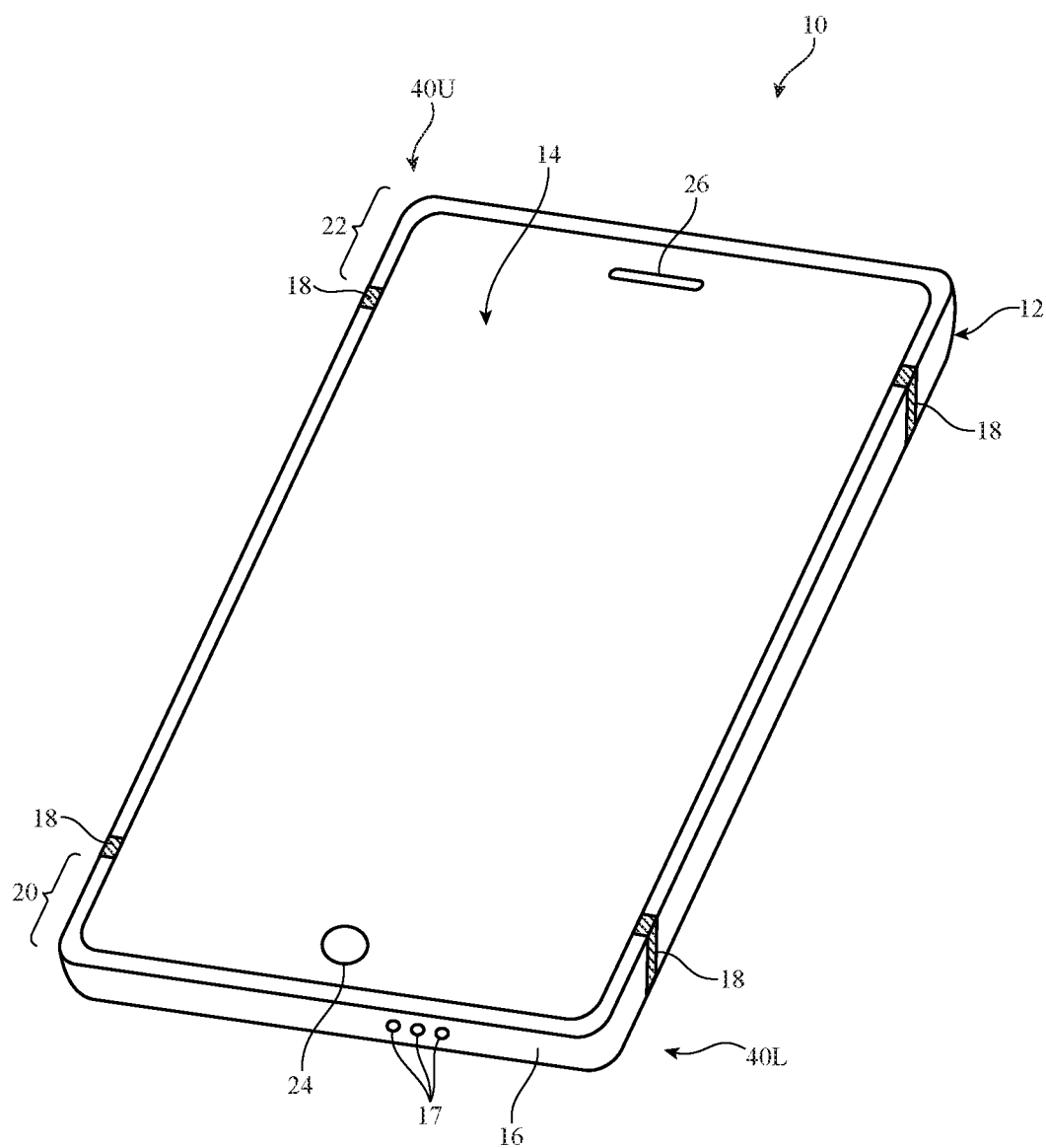
FIG. 1 is a perspective view of an illustrative electronic device with wireless communications circuitry in accordance with an embodiment.

Electronic devices such as electronic device 10 of FIG. 1 may contain wireless communications circuitry. The wireless communications circuitry may be used to support wireless communications in multiple wireless communications bands.

The wireless communications circuitry of device 10 may include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth® band and the 2.4 GHz and 5 GHz WiFi® wireless local area network bands (sometimes referred to as IEEE 802.11 bands or wireless local area network communications bands). If desired, device 10 may also contain wireless communications circuitry for implementing near-field communications, light-based wireless communications, or other wireless communications (e.g., millimeter wave communications at 60 GHz or other extremely high frequencies, etc.).

The wireless communications circuitry may include one more antennas. The antennas of the wireless communications circuitry can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structure may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a planar housing wall. The rear housing wall may be have slots that pass entirely through the rear housing wall and that therefore separate housing wall portions (and/or sidewall portions) of housing 12 from each other. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. Buttons such as button 24 may pass through openings in the cover layer. The cover layer may also have other openings such as an opening for speaker port 26. Speaker port 26 may allow audio signals (sound) to be heard by a user of device 10 (e.g., while the user holds device 10 and speaker port 26 to their ear). Speaker port 26 may therefore sometimes be referred to herein as ear speaker port 26 or ear speaker 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16. If desired, holes such as holes 17 may be provided in peripheral structures 16 or in a rear surface of housing 12. Speakers within device 10 may transmit sound to the exterior of device 10 through holes 17 and/or through ear speaker 26. If desired, microphones may be placed adjacent to holes 17 or any other desired locations within device 10 on to generate audio signals from sound received by device 10.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Housing 12 may include internal conductive structures such as metal frame members and a planar conductive housing member (sometimes referred to as a midplate) that spans the walls of housing 12 (i.e., a substantially rectangular sheet formed from one or more parts that is welded or otherwise connected between opposing sides of member 16). Device 10 may also include conductive structures such as printed circuit boards, components mounted on printed circuit boards, and other internal conductive structures. These conductive structures, which may be used in forming a ground plane in device 10, may be located in the center of housing 12.

In regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air, plastic, and other dielectrics and may be used in forming slot antenna resonating elements for one or more antennas in device 10.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22.

In general, device 10 may include any suitable number of antennas (e.g., one or more, two or more, three or more, four or more, etc.). In the example of FIG. 1, device 10 includes a first antenna 40L and a second antenna 40U formed on opposing sides of device 10. For example, antenna 40L may be formed within region 20 at the lower end of device 10 (e.g., the end of device 10 adjacent to microphone holes 17) and may therefore sometimes be referred to herein as lower antenna 40L. Similarly, antenna 40U may be formed within region 22 at the upper end of device 10 (e.g., the end of device 10 adjacent to ear speaker 26) and may therefore sometimes be referred to herein as upper antenna 40U. Antennas 40L and 40U may, if desired, be used separately to cover identical communications bands, overlapping communications bands, or separate communications bands. The antennas may be used to implement an antenna diversity scheme or a multiple-input-multiple-output (MIMO) antenna scheme.

The arrangement of FIG. 1 is merely illustrative. In general, the antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations.

Portions of peripheral housing structures 16 may be provided with peripheral gap structures. For example, peripheral conductive housing structures 16 may be provided with one or more gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two of gaps 18), three peripheral conductive segments (e.g., in an arrangement with three of gaps 18), four peripheral conductive segments (e.g., in an arrangement with four gaps 18, etc.).

The segments of peripheral conductive housing structures 16 that are formed in this way may form parts of antennas in device 10. For example, the segment of peripheral conductive housing structures 16 that is located between the two gaps 18 in region 20 may form some or all of an antenna resonating element for lower antenna 40L (e.g., one or more resonating element arms of an inverted-F antenna resonating element in scenarios where lower antenna 40L is an inverted-F antenna, a portion of a loop antenna resonating element in scenarios where lower antenna 40L is a loop antenna, a conductive portion that defines an edge of a slot antenna resonating element in scenarios where lower antenna 40L is a slot antenna, combinations of these, or any other desired antenna resonating element structures). Similarly, the segment of peripheral conductive housing structures 16 that is located between the two gaps 18 in region 22 may form some or all of an antenna resonating element for upper antenna 40U. This example is merely illustrative. If desired, antennas 40L and 40U may not include any portion of peripheral conductive housing structures 16 or segments of structures 16 may form part of an antenna ground plane for antennas 40L and 40U.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
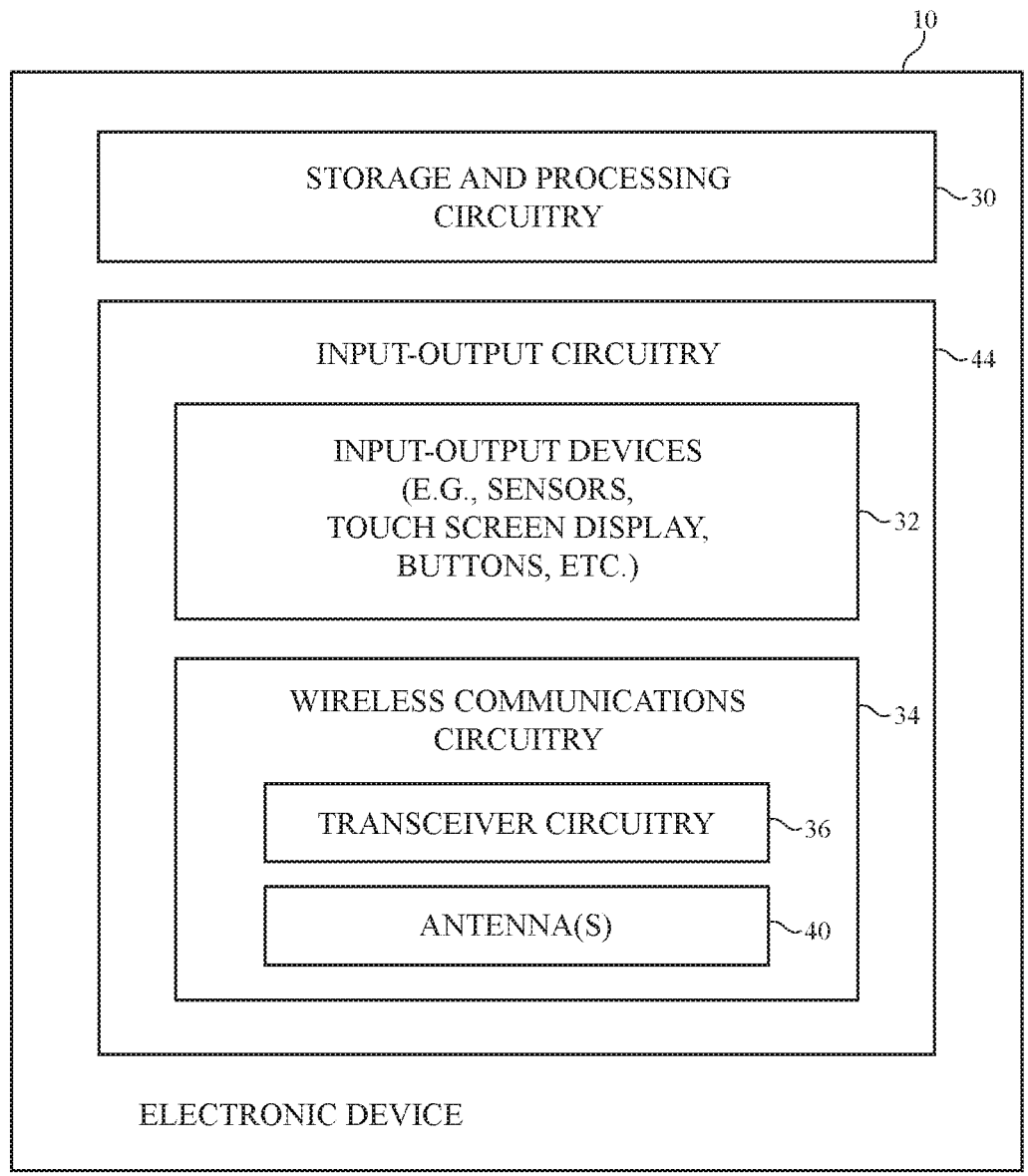
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processor integrated circuits, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc. If desired, circuitry 30 may be used in tuning antennas, adjusting wireless transmit powers for transceivers in device 10 (e.g., transmit powers may be adjusted up and down in response to transmit power commands from wireless base stations while observing an established overall maximum allowed transmit power), and/or in otherwise controlling the wireless operation of device 10.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, compasses, accelerometers or other components that can detect motion and device orientation relative to the Earth, capacitance sensors, proximity sensors (e.g., a capacitive proximity sensor and/or an infrared proximity sensor), touch sensors, magnetic sensors, a connector port sensor or other sensor that determines whether device 10 is mounted in a dock, radio-frequency sensors, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 36 for handling various radio-frequency communications bands. For example, circuitry 36 may include wireless local area network transceiver circuitry that may handle 2.4 GHz and 5 GHz bands for WiFi® (IEEE 802.11) communications and that may handle the 2.4 GHz Bluetooth® communications band, may include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples), and may include circuitry for other short-range and long-range wireless links if desired. If desired, wireless transceiver circuitry 36 may include 60 GHz transceiver circuitry, circuitry for receiving television and radio signals, paging system transceivers, near field communications (NFC) circuitry, etc. Wireless transceiver circuitry 36 may also include satellite navigation system circuitry such as global positioning system (GPS) receiver circuitry for receiving GPS signals at 1575 MHz or for handling other satellite positioning data (e.g., GLONASS signals at 1609 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Antennas 40 in wireless communications circuitry 34 (e.g., antennas such as antennas 40U and 40L of FIG. 1) may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for transmitting and/or receiving signals in a particular band or, if desired, antennas 40 can be configured to receive signals for multiple communications bands.

Device 10 may contain multiple antennas 40. The antennas may be used together or one of the antennas may be switched into use while the other antenna(s) may be switched out of use. If desired, control circuitry 30 may be used to select an optimum antenna to use in device 10 in real time and/or an optimum setting for tunable wireless circuitry associated with one or more of antennas 40. Storage and processing circuitry 30, input-output circuitry 44, and other components of device 10 may be mounted in device housing 12.

Figure 3:
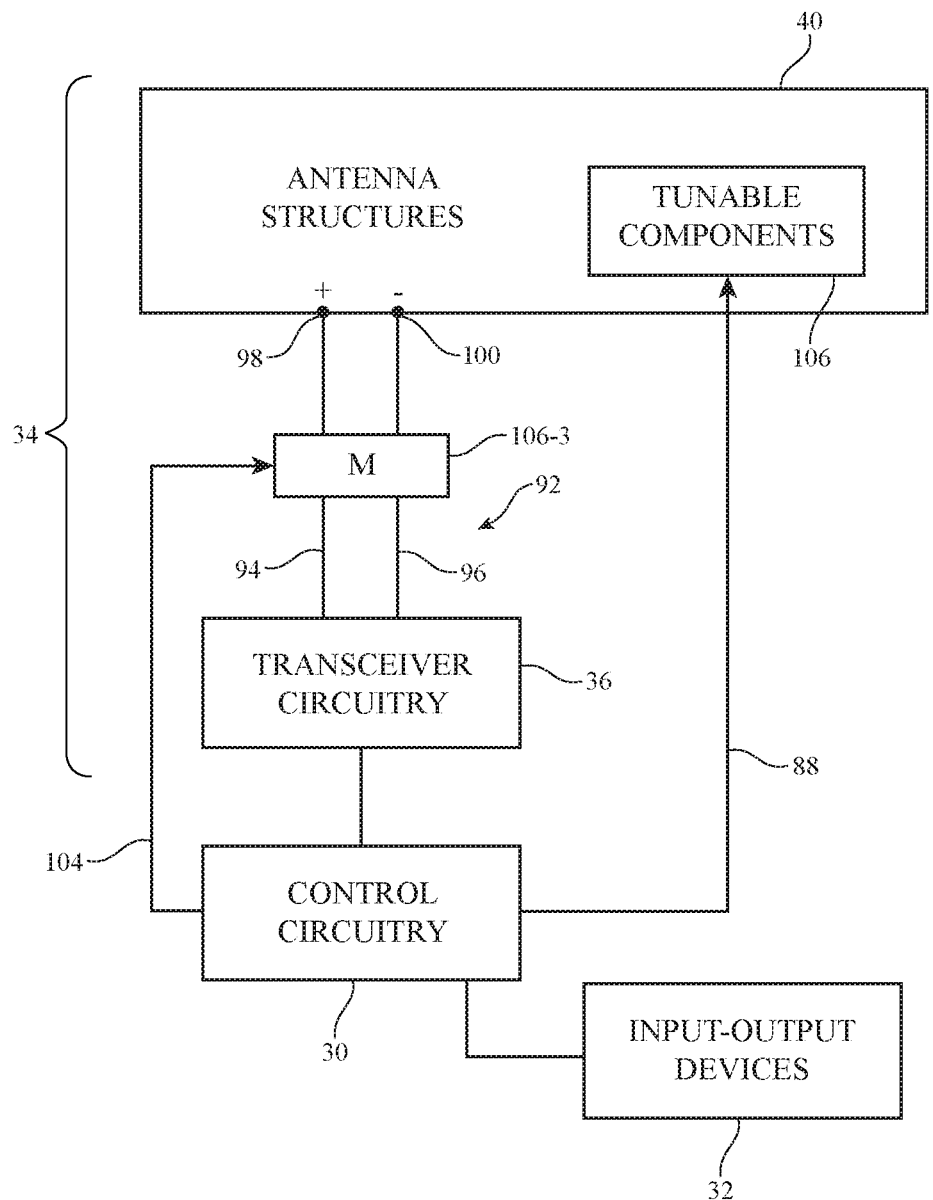
FIG. 3 is a diagram of illustrative wireless communications circuitry in accordance with an embodiment.

As shown in FIG. 3, transceiver circuitry 36 in wireless circuitry 34 may be coupled to antenna structures 40 using paths such as path 92. Transmission line paths in device 10 such as transmission line 92 may include coaxial cable paths, microstrip transmission lines, stripline transmission lines, edge-coupled microstrip transmission lines, edge-coupled stripline transmission lines, transmission lines formed from combinations of transmission lines of these types, etc. A separate respective transmission line 92 may be used in routing signals between each antenna 40 in device 10 and transceiver circuitry 36 (as an example).

Filter circuitry, switching circuitry, impedance matching circuitry, and other circuitry may be interposed within the transmission lines, if desired (see, e.g., impedance matching and filter circuitry 106-3 interposed on transmission line 92).

Wireless circuitry 34 may be coupled to control circuitry 30. Control circuitry 30 may be coupled to input-output devices 32. Input-output devices 32 may supply output from device 10 and may receive input from sources that are external to device 10. Control circuitry 30 may use wireless circuitry 34 to transmit and receive wireless signals.

To provide antenna structures 40 with the ability to cover communications frequencies of interest, antenna structures 40 may be provided with circuitry such as filter circuitry (e.g., one or more passive filters and/or one or more tunable circuits). If desired, antenna structures 40 may be provided with adjustable circuits such as tunable components 106 to tune antennas over communications bands of interest. Tunable components 106 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures.

During operation of device 10, control circuitry 30 may issue control signals on one or more paths such as path 88 that adjust inductance values, capacitance values, or other parameters associated with tunable components 106, thereby tuning antenna structures 40 to cover desired communications bands. Configurations in which antennas 40 are fixed (not tunable) and configurations in which tunable components 106 are incorporated into circuits such as filter and matching circuits (e.g., circuit 106, which may contain tunable components controlled using signals on path 122), in which tunable components 106 are incorporated into parasitic antenna elements (e.g., parasitics in structures 40), and other arrangements in which wireless circuitry 34 includes adjustable components may also be used.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). A tunable impedance matching network (matching circuit) such as matching circuit 106-3 that is formed from components such as inductors, resistors, and capacitors may be used in matching the impedance of antenna structures 40 to the impedance of transmission line 92 and may, if desired, incorporate a band pass filter, band stop filter, high pass filter, and/or low pass filter. Matching network components may be provided as discrete components (e.g., surface mount technology components) or may be formed from housing structures, printed circuit board structures, traces on plastic supports, etc. Components such as these may also be used in forming filter circuitry in antenna structures 40. As shown in FIG. 3, control circuitry 30 may adjust circuitry such as circuitry 106-3 (e.g., tunable components in circuitry 106-3) by issuing control signals on paths such as path 104.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. The illustrative feeding configuration of FIG. 3 is merely illustrative.

Figure 4:
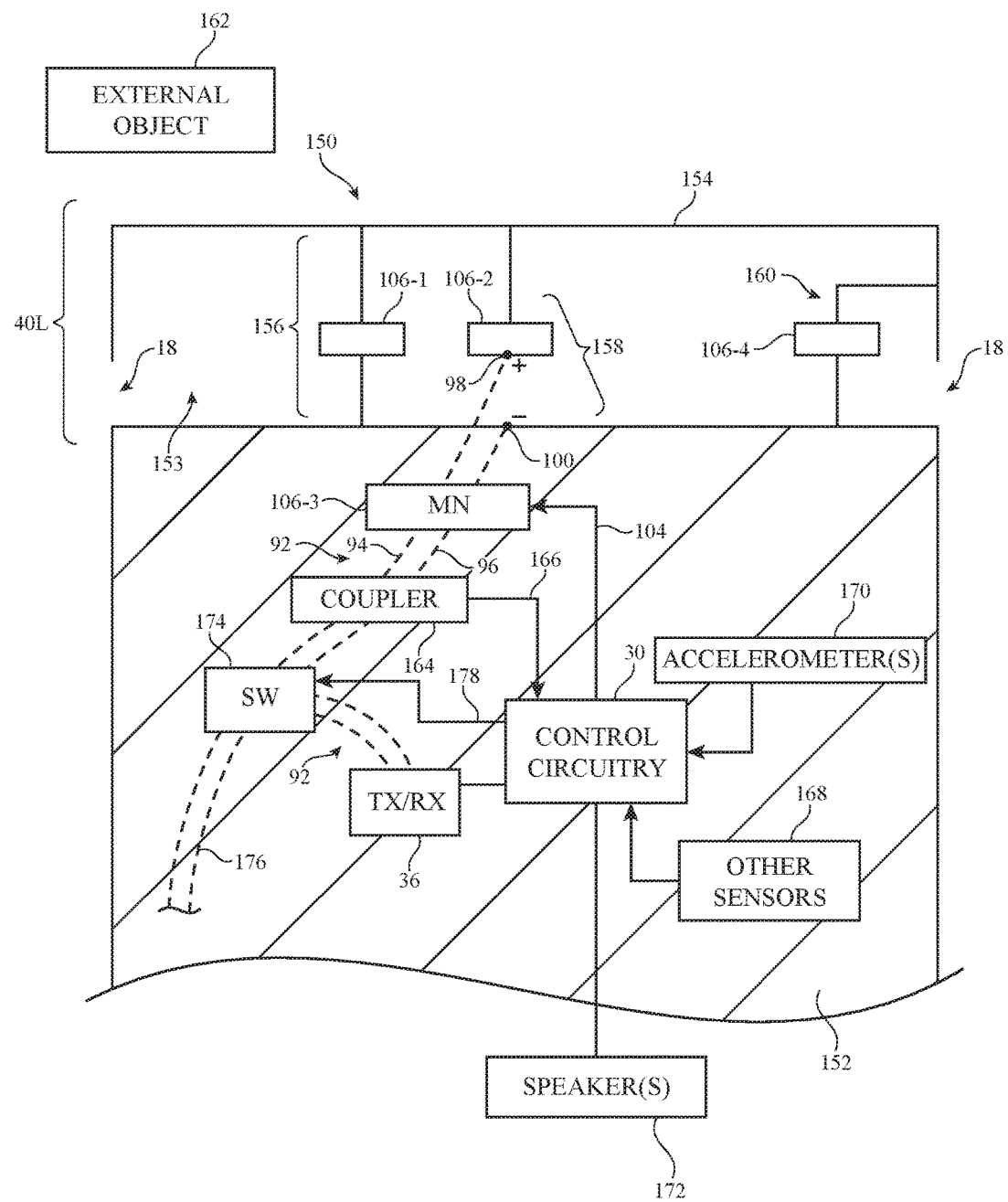
FIG. 4 is a diagram of a portion of an electronic device with circuitry that may be used to gather antenna signals and other signals to help determine how to adjust wireless circuitry in accordance with an embodiment.

FIG. 4 is a diagram of wireless circuitry in an illustrative configuration for electronic device 10. In the example of FIG. 4, lower antenna 40L is based on an inverted-F antenna. This is merely illustrative. In general, antenna 40L may be based on any suitable antenna type (slot, inverted-F, planar inverted-F, loop, hybrid slot and inverted-F, other types of antennas, and hybrids based on multiple antenna structures such as these). Similar structures to those shown in FIG. 4 may be used to form upper antenna 40U, if desired, or upper antenna 40U may be formed using different structures.

As shown in FIG. 4, lower antenna 40L includes antenna resonating element 150 and antenna ground (ground plane) 152. Antenna resonating element 150 may have a main resonating element arm such as arm 154. Arm 154 may have multiple branches (e.g., a short branch for supporting a high band resonance and a long branch for supporting a low band resonance). Arm 154 may, for example, be formed using a segment of peripheral conductive housing structures 16 (FIG. 1). Arm 154 may be separated from ground plane 152 by opening 153 (e.g., an opening between peripheral conductive structures 16 and ground plane 152). The size of arm 154 (e.g., the lengths of the branches of arm 154) may be selected so that antenna 40L resonates at desired operating frequencies.

Main resonating element arm 154 may be coupled to ground 152 by return path 156. Antenna feed 158 may include positive antenna feed terminal 98 and ground antenna feed terminal 100 and may run parallel to return path 156 between arm 154 and ground 152.

If desired, antenna 40L may have tunable components (e.g., tunable components such as components 106-3 and 106 of FIG. 3). For example, antenna 40L may have tunable components 106-1 in return path 156, tunable components 106-2 in feed path 158, tunable components 106-3 in a matching network interposed in transmission line path 92, and/or tunable components 106-4 in an additional antenna path such as illustrative path 160 coupled between resonating element arm 154 and ground 152. Tunable component(s) 106-1, 106-2, 106-3, and 106-4 may include adjustable inductors, adjustable capacitors, and/or other adjustable components. By adjusting components 106-1, 106-2, 106-3, and 106-4, the impedance of antenna 40L and matching circuit 106-3 and therefore the frequency response of antenna 40L may be tuned.

Antennas such as antenna 40L of FIG. 4 may be affected by the presence of nearby objects. For example, an antenna may exhibit an expected frequency response when device 10 is operated in free space in the absence of nearby external objects such as external object 162, but may exhibit a different frequency response when device 10 is operated in the presence of external object 162. The magnitude of the distance between external object 162 and antenna 40L and the type of object 162 may also influence antenna performance.

External objects such as object 162 may include a user's body (e.g., a user's head, a user's leg, a user's hand, or other user body part), may include a table or other inanimate object on which device 10 is resting, may include dielectric objects, may include a user's clothing, may include conductive objects, and/or may include other objects that affect wireless performance (e.g., by loading antenna 40L in device 10 and thereby affecting antenna impedance for antenna 40L).

When an external object such as object 162 is brought into the vicinity of antenna 40L (e.g., when object 162 is within 10 cm of antenna 40L, when object 162 is within 1 cm of antenna 40L, when object 162 is within 1 mm of antenna 40L, or when the distance between antenna 40L and object 162 has other suitable values), antenna 40L may exhibit an altered frequency response (e.g., antenna 40L may be detuned because the impedance of the antenna has been changed due to loading from object 162). In addition, different types of object 162 may detune antenna 40L by differing amounts (e.g., because different materials will load antenna 40L differently). For example, a user's hand, a user's head, and other parts of a user's body may each detune antenna 40L by a different respective amount when in the vicinity of antenna 40L.

Antenna adjustments can be made by control circuitry 30 based on knowledge of the current operating state of device 10 and based on knowledge of the operating environment of device 10. Information about the current operating state of device 10 may include information about what transmit power levels are used to transmit radio-frequency signals, information about what frequencies are used for communications, information about which antennas 40 are active, information about a task being performed by device 10 (e.g., information identifying whether device 10 is being used to make a telephone call, check email, send a text message, browse the internet, etc.), information about what input/output components on device 10 are active, information about whether audio of different types is being played be device 10, information about whether device 10 is currently being used for a telephone call or to communicate data signals, or any other desired information.

Information about the operating environment of device 10 may be provided to control circuitry 30 using sensor data and/or based on antenna feedback from radio-frequency coupler 164. The information about the operating environment of device 10 may include information about any external objects 162 that may be present and/or the effects of external objects 162 on antennas 40, information about whether device 10 is in motion, information about the orientation of device 10 relative to the earth, etc.

Coupler 164 may be used to tap antenna signals flowing to and from antenna 40L. Tapped antenna signals from coupler 164 may be conveyed to control circuitry 30 over coupler path 166. In the example of FIG. 4, coupler 164 is coupled between adjustable component 106-3 and transceiver 36. If desired, coupler 164 may be coupled between adjustable component 106-3 and feed terminals 98/100. The tapped antenna signals may be processed using receiver circuitry or other circuitry associated with control circuitry 30. Control circuitry 30 may gather phase and magnitude information from the tapped antenna signals on path 166. Control circuitry 30 may use the gathered phase and magnitude information to determine the impedance of antenna 40L during the operation of wireless circuitry 34.

For example, control circuitry 30 may convert the measured phase and magnitude values to complex impedance data points. The complex impedance data points may include, for example, scattering parameter (so-called "S-parameters") values that are indicative of the complex impedance of antenna 40. Measurements of the S-parameters may include measured reflection coefficient parameter values (S11 values) that are indicative of the amount of radio-frequency signals that is reflected back towards coupler 164 from antenna 40L during signal transmission.

Control circuitry 30 may use the impedance of antenna 40L (e.g., the complex impedance data points or S11 values measured for antenna 40L) to determine whether the behavior of antenna 40L is being influenced by the presence of external object 162. Circuitry 30 may use the complex impedance values to determine the extent to which the behavior of antenna 40L is being influenced by the presence of external object 162.

For example, as external object 162 approaches and influences antenna 40L (e.g., by loading antenna 40L), the amount of transmitted radio-frequency signals that are reflected back towards coupler 164 may change. This change in signal reflection may change the S11 values that are measured over coupler 164. Similarly, different materials that are present in object 162 may affect the S11 values that are measured over coupler 164. Control circuitry 30 may use measurements of the S11 values to obtain knowledge of the operating environment of device 10 over time. Control circuitry 30 may use this information to adjust antenna 40L to correct for any detuning caused by the presence of external object 162.

In this way, antenna impedance information associated with antenna 40L (e.g., as measured using signals tapped by coupler 164) may be used to at least partially determine the operating environment of device 10. If desired, other components such as sensors 168 and/or accelerometer 170 may also be used by device 10 to help determine the operating environment of device 10.

Sensors 168 may, for example, include proximity sensors such as capacitive proximity sensors or light-based proximity sensors. Proximity sensors in sensor circuitry 168 may provide data to control circuitry 30 indicating that external object 162 is within a predetermined distance of antenna 40L or otherwise indicating that is nearby to antenna 40L. If desired, sensors 168 may include connector sensors or accessory sensors that provide data to control circuitry 30 identifying when an accessory is connected to device 10 and/or what type of accessory is connected to device 10. Sensors 168 may, if desired, include audio sensors that measure sound signals and provide data identifying the sound signals to control circuitry 30. Sensors 168 may include any other desired sensors such as temperature sensors, magnetic sensors, visual sensors such as light detectors and image sensors (e.g., camera sensors for front and/or rear cameras), etc.

Accelerometer 170 may be used to gather signals on the motion of device 10. Accelerometer 170 may provide data that indicates whether device 10 is in motion and/or that indicates an amount of motion that device 10 is experiencing to control circuitry 30. For example, if a user of device 10 is carrying device 10 in a pocket or in the user's hand, device 10 may jiggle at a characteristic frequency. Device 10 may exhibit different accelerometer signals when at rest on a table. Control circuitry 30 may process data from sensors 168, data from accelerometer 170, and/or phase and magnitude measurements from coupler 164 to determine the current operating environment of device 10 (e.g., to determine whether device 10 is being used by a user or is resting on an inanimate object, how device 10 is being held, or to determine other information about the presence of external objects 162 in the vicinity of device 10).

During operation of device 10, control circuitry 30 can use this information on the current operating environment of device 10 to determine how to adjust tunable antenna components (e.g., components such as components 106-1, 106-2, 106-3, and/or 106-4) to compensate for any detuning of antennas 40 due to the presence of external objects 162. If desired, this information may also be used to determine how to adjust the maximum permissible transmit power levels of antennas 40.

For example, there may be regulatory standards such as government or industry regulations that limit radio-frequency signal powers for electronic devices. In many jurisdictions, regulatory standards impose maximum energy absorption limits on manufactures of electronic devices. Such maximum energy absorption limits typically include specific absorption rate (SAR) limits and other absorption limits. These standards place restrictions on the amount of transmitted wireless power that can be absorbed by users or other entities in the vicinity of wireless electronic devices.

In order to ensure that such standards are satisfied (e.g., to limit absorption of wireless power by sensitive objects), control circuit 30 may limit the maximum transmit power levels that are provided by antennas 40. For example, control circuitry 30 may control amplifier circuitry interposed between transceiver 36 and antenna 40 (not shown) that amplifies radio-frequency signals to be transmitted by antenna 40 to a desired transmit power level. The transmit power level may be adjusted to ensure satisfactory link quality while also minimizing power consumption in the device. By imposing a maximum transmit power level, control circuitry 30 may control the amplifier circuitry to only transmit radio-frequency signals at transmit power levels that are below the maximum transmit power level, for example.

If desired, control circuitry 30 may use information about the current operating state of device 10 in addition to information about the current operating environment of device 10 to determine how to adjust the tunable antenna components and/or to adjust the maximum transmit power levels of antennas 40. The information about the current operating state may include information about which antenna is active, what frequencies are being used for communication, a task that is being performed by device 10 (e.g., information about whether the device is being used to make a telephone call, being used to browse the internet, being used to check email, being used to send a text message, etc.), information about audio that is being played by speakers 172, or any other desired information.

Control circuitry 30 may provide audio signals to speakers 172. Speakers 172 may include ear speaker 26 (FIG. 1), speakers adjacent to holes 17, or any other desired speakers. If desired, control circuitry 30 may use information about whether audio is being played over speakers 172 when determining the current operating state of device 10.

If desired, switching circuitry such as switching circuitry 174 may be interposed on transmission line 92. Switching circuitry 174 may be used so that only a given one of antennas 40L and antenna 40U is used to transmit radio-frequency signals at a given time. For example, switching circuitry 174 may have a first state in which radio-frequency signals are transmitted from transceiver 36 to lower antenna 40L. Switch 174 may have a second state in which radio-frequency signals are transmitted from transceiver 36 to upper antenna 40U. Control circuitry 30 may provide control signals to switch 174 over path 178 that control the state of switch 174 (e.g., to selectively activate a given antenna for transmission. Control circuitry 30 may use information about which antenna 40 is transmitting radio-frequency signals at a given time when determining the current operating state of device 10.

The example of FIG. 4 is merely illustrative. If desired, switch 174 may be omitted. Other switching circuitry may be used to select a given antenna 40 for signal transmission if desired. In another suitable arrangement, a given antenna 40 may be selected for transmission by selectively activating and deactivating transmitter circuits coupled to each antenna.

Control circuitry 30 may combine this information about the current operating state of device 10 with the information about the current operating environment of device 10 to determine how to adjust antennas 40 to compensate for detuning and to determine how to adjust maximum transmit power levels imposed on antennas 40 (e.g., to establish an appropriate maximum transmit power for transceiver circuitry 36, to tune antenna 40L, etc.).

Consider, as an example, a scenario in which a user of device 10 is making a voice telephone call while pressing device housing 12 against the user's head. In this scenario, it may be desirable to limit the maximum transmit power from transceiver circuitry 36 (e.g., to ensure that regulatory standards that impose maximum energy absorption limits are satisfied). By determining whether the user is using ear speaker 26 (FIG. 1), control circuitry 30 can determine whether or not transmit power should be limited. Coupler 164 and/or other sensors on device 10 may be used to determine whether antenna detuning due to the user holding device 10 needs to be compensated for by adjusting tunable components 106.

When making antenna adjustments, sensors such a sensors 168 and 170 and information about the current operating state of device 10 may be used in an open loop fashion to predict how much antenna 40L should be adjusted to compensate for detuning. Feedback from coupler 166 may be used in real time in a closed loop fashion to measure antenna detuning. This may allow control circuitry 30 to adjust antennas 40 to compensate for any measured antenna detuning as it occurs. If desired, both sensor data and antenna impedance data from coupler 164 may be used.

The example of FIG. 4 is merely illustrative. In general, antenna 40L may include any desired circuitry. Antenna 40L may be any type of antenna arranged in any desired manner. Any desired number of antennas 40 may be coupled to control circuitry 30. If desired, similar structures may be used by upper antenna 40U or by other antennas 40 in device 10.

Figure 5:
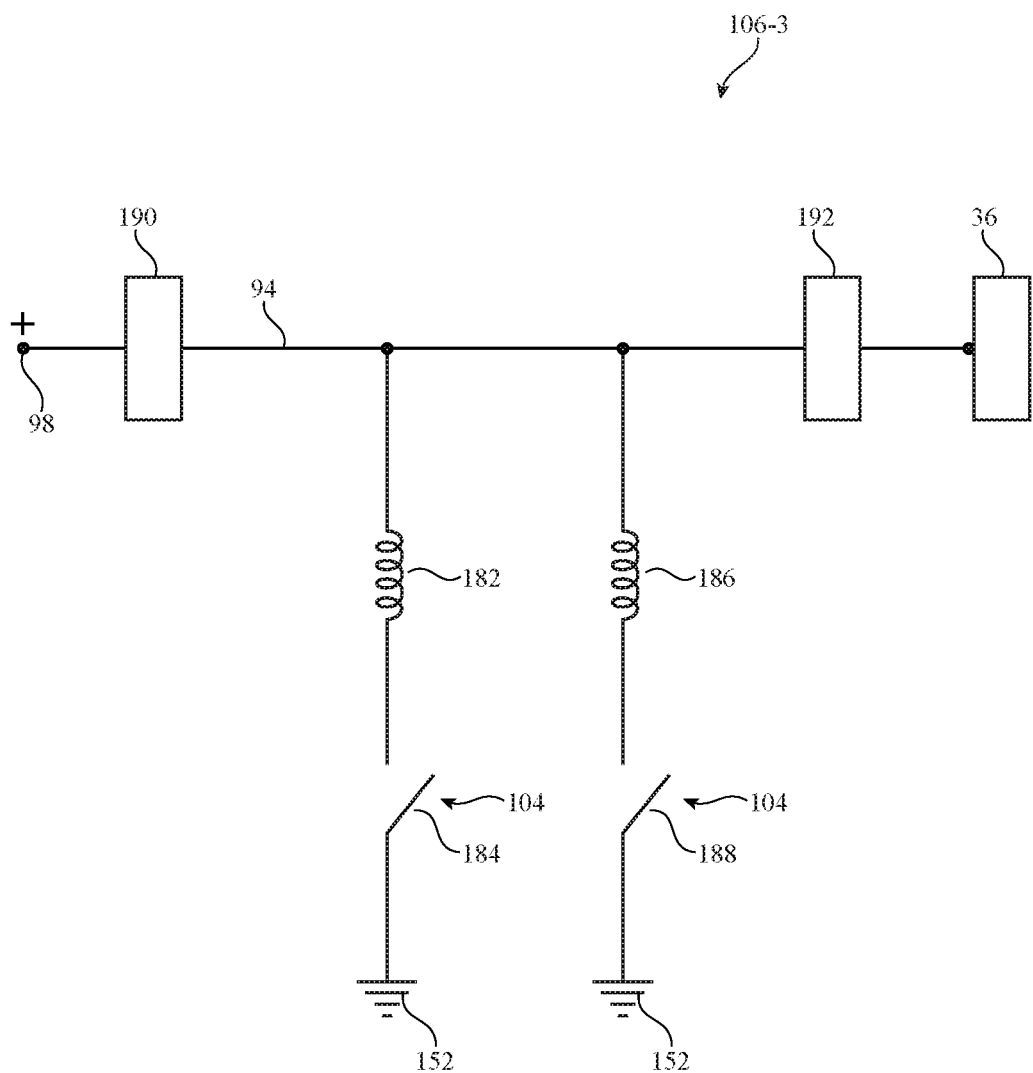
FIG. 5 is a circuit diagram of illustrative tuning circuitry that may be adjusted to tune the resonating frequency of an antenna in accordance with an embodiment.

FIG. 5 is a circuit diagram showing one possible circuit that may be used to form adjustable matching circuitry 106-3 of FIGS. 3 and 4. As shown in FIG. 5, adjustable matching circuitry 106-3 may include a first inductor 182 connected in series with first switch 184 between signal conductor 94 of transmission line 92 and ground 152. Matching circuitry 106-3 may include a second inductor 186 connected in series with second switch 188 between signal conductor 94 and ground. Switches 184 and 188 may be single-pole single-throw (SPST) switches, for example. Circuitry 106-3 in this example of FIG. 5 may therefore sometimes be referred to herein as shunt SPST circuitry.

Inductor 182 may have a first inductance value and inductor 186 may have a second inductance value that is equal to or different from the first inductance value. Control circuitry 30 may provide control signals 104 to selectively open and close switches 184 and 188. Opening and closing switches 184 and 188 may be performed to adjust the tuning of antenna 40L (e.g., to compensate for detuning due to the presence of object 162).

For example, control circuitry 30 may compensate for a first amount of detuning in lower antenna 40L by opening switch 184 and closing switch 188 (e.g., when device 10 is in a free-space environment). Control circuitry 30 may compensate for a second amount of detuning in lower antenna 40L by opening switch 188 and closing switch 184 (e.g., when device 10 is being held or gripped by a user such that the user's hand serves as external object 162 adjacent to lower antenna 40L). If desired, additional matching circuitry 190 may be interposed on line 94 between feed 98 and the connection to inductor 182 and/or additional matching circuitry 192 may be interposed on line 94 between the connection to inductor 186 and transceiver 36.

The example of FIG. 5 is merely illustrative. If desired, circuitry 106-3 may include any desired resistive, inductive, capacitive, and/or switching components arranged in any desired manner. Any other desired switches such as single pole four-throw (SP4T) switches may be formed in circuitry 106-3. Circuitry 106-3 or other tunable circuits such as circuits 106-1, 106-2, and/or 106-4 may be adjusted using control signals 104 and/or control signals 88 (FIG. 3) to compensate for detuning of antenna 40L due to the presence of external object 162.

Figure 6:
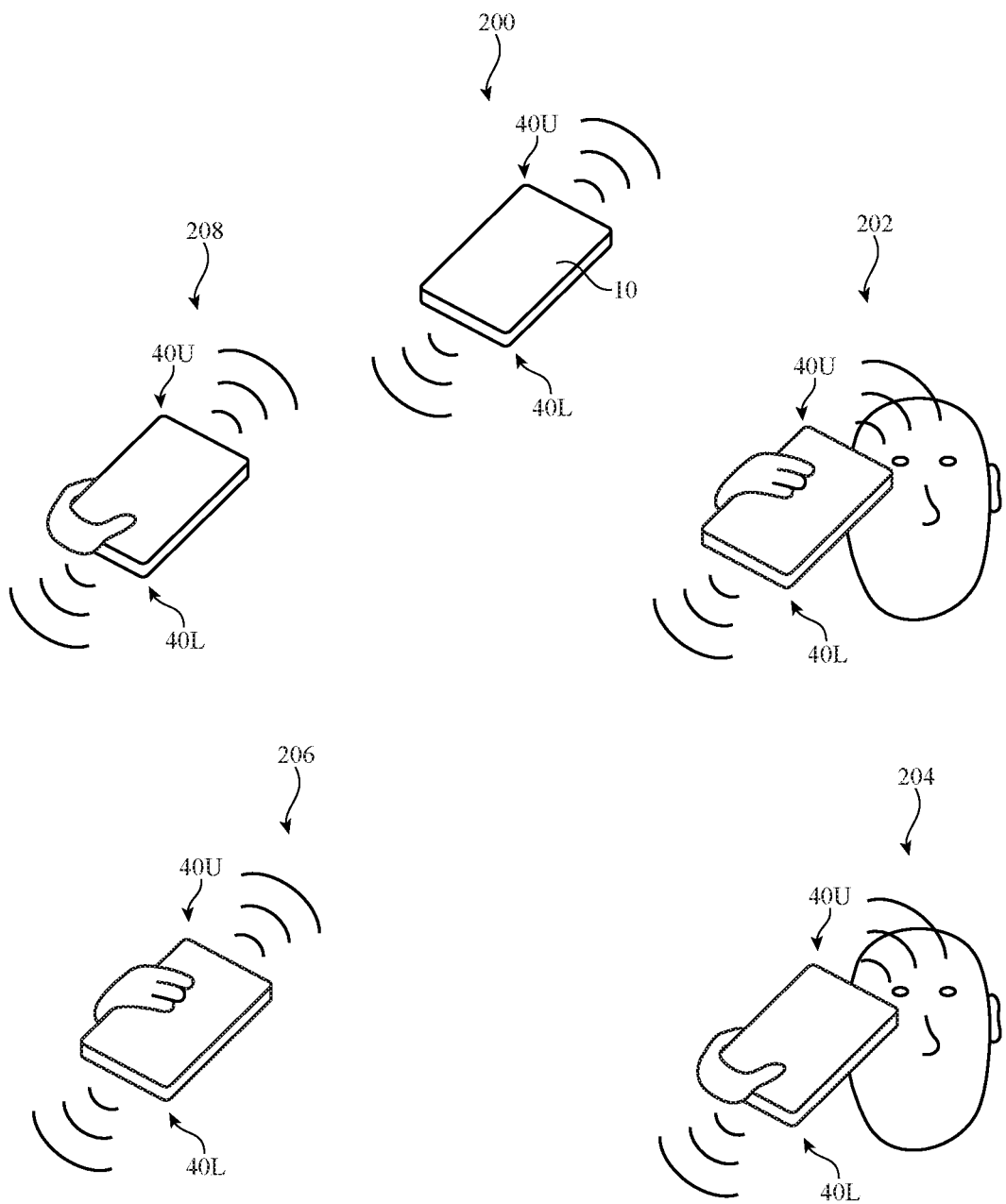
FIG. 6 is a diagram showing examples of different wireless operating environments of an illustrative electronic device in accordance with an embodiment.

FIG. 6 is a diagram showing different possible operating environments for device 10. As shown in FIG. 6, device 10 may be operated in a free-space environment such as free-space environment 200. Free-space environment 200 may be any environment in which external objects such as object 162 of FIG. 4 are not located in the vicinity of antennas 40 or any environment in which external objects adjacent to antennas 40 do not significantly impact the performance of antennas 40. For example, when located in free-space environment 200, device 10 may be resting on a tabletop or other surface that does not significantly detune antennas 40.

In free-space environment 200, upper antenna 40U and lower antenna 40L of device 10 may transmit radio-frequency signals without being detuned by external objects. As device 10 is not in the vicinity of a body in scenario 200, control circuitry 30 need not limit the maximum transmit power levels of antennas 40 (or the maximum transmit power levels may be relatively high).

During normal operation, a user may hold device 10 in their hand (e.g., to interact with device 10). In scenarios where the user is making a telephone call with device 10, the user may also hold device 10 up to their head (e.g., so that the ear of the user is adjacent to ear speaker 26). Environments 202 and 204 of FIG. 6 illustrate two possible scenarios where the user holds device 10 up to their head. In practice, there may also be other scenarios where the user holds device 10 up to their head such as to listen to audio, take photographs, or to perform any other desired operations.

When the user holds device 10 to their head as shown in operating environments 202 and 204, upper antenna 40U may be adjacent to the user's head. Some of the signals transmitted by upper antenna 40U may be absorbed by the user's head. In order to satisfy regulatory requirements on maximum energy absorption, the maximum transmit power level of antenna 40U and/or antenna 40L may be limited when device 10 is operated in environments 202 and 204 to ensure that the amount of signal absorption by the user's head meets the regulatory requirements.

In other scenarios, the user may hold device 10 away from their head such as in operating environments 208 and 206 of FIG. 6. In environments 206 and 208, the user's hand may be adjacent to antennas 40 and may potentially detune antennas 40 during wireless communications. As examples, device 10 may be located in environments 208 and 206 when the user is text messaging with device 10, browsing the internet with device 10, interacting with software applications on device 10, conducting a speakerphone telephone call with device 10, or at any other time while the user holds device 10 in their hands.

Lower antenna 40L of device 10 may have at least two discrete tuning settings or states (e.g., tunable components 106 may have two discrete settings or states). The two tuning settings may compensate for any potential detuning of lower antenna 40L due to proximity of the user's body or other objects to lower antenna 40L.

For example, lower antenna 40L may have a first tuning setting that compensates for antenna detuning when the user holds device 10 (e.g., when device is in operating environment 202, 204, 206, or 208). Lower antenna 40L may have a second tuning setting for when the user is not holding device 10 (e.g., when the device is in free-space environment 200). The second tuning setting may allow antenna 40L to be well matched with transmission line 92 in the absence of external objects 192, thereby allowing antenna 40L to be properly tuned in the free-space environment. The first tuning setting may sometimes be referred to herein as a grip tuning setting or state (e.g., because the first setting is used to compensate for detuning caused by the user gripping the device). The second tuning setting may sometimes be referred to herein as a free-space tuning setting or state.

In scenarios where tuning circuit 106-3 of FIG. 5 is used, the first tuning setting may be a setting in which switch 184 is open and switch 188 is closed whereas the second tuning setting is a setting in which switch 184 is closed and switch 188 is open, for example. When control circuitry 30 determines that the user's body is in the vicinity of antenna 40L, control circuitry 30 may control tuning circuitry 106 to place antenna 40L in the first tuning state. Otherwise, control circuitry 30 may control tuning circuitry 106 to place antenna 40L in the second tuning state. In this way, antenna 40L may be well matched to its surroundings so that the antenna remains properly tuned during operation.

In practice, when interacting with device 10, different users may hold the device in different positions. For example, a first group of users may hold device 10 along the lower edge of housing 12 as shown in operating environments 208 and 204. A second group of users may hold device 10 elsewhere along housing 12 (e.g., along the middle of housing 12) as shown in operating environments 206 and 202.

The performance of antennas 40 may depend on how the user holds device 10. For example, lower antenna 40L may be detuned by a greater amount when held as shown in environments 208 and 204 than when held as shown in environments 206 and 202. This may be due to the user's hand loading lower antenna 40L more when holding device 10 along the bottom of housing 12 than when holding device 10 along the middle of housing 12. If care is not taken, switching antenna 40L between the first and second tuning states may properly compensate for antenna detuning for one group of users while deteriorating antenna performance or further detuning the antenna for another group of users.

Figure 7:
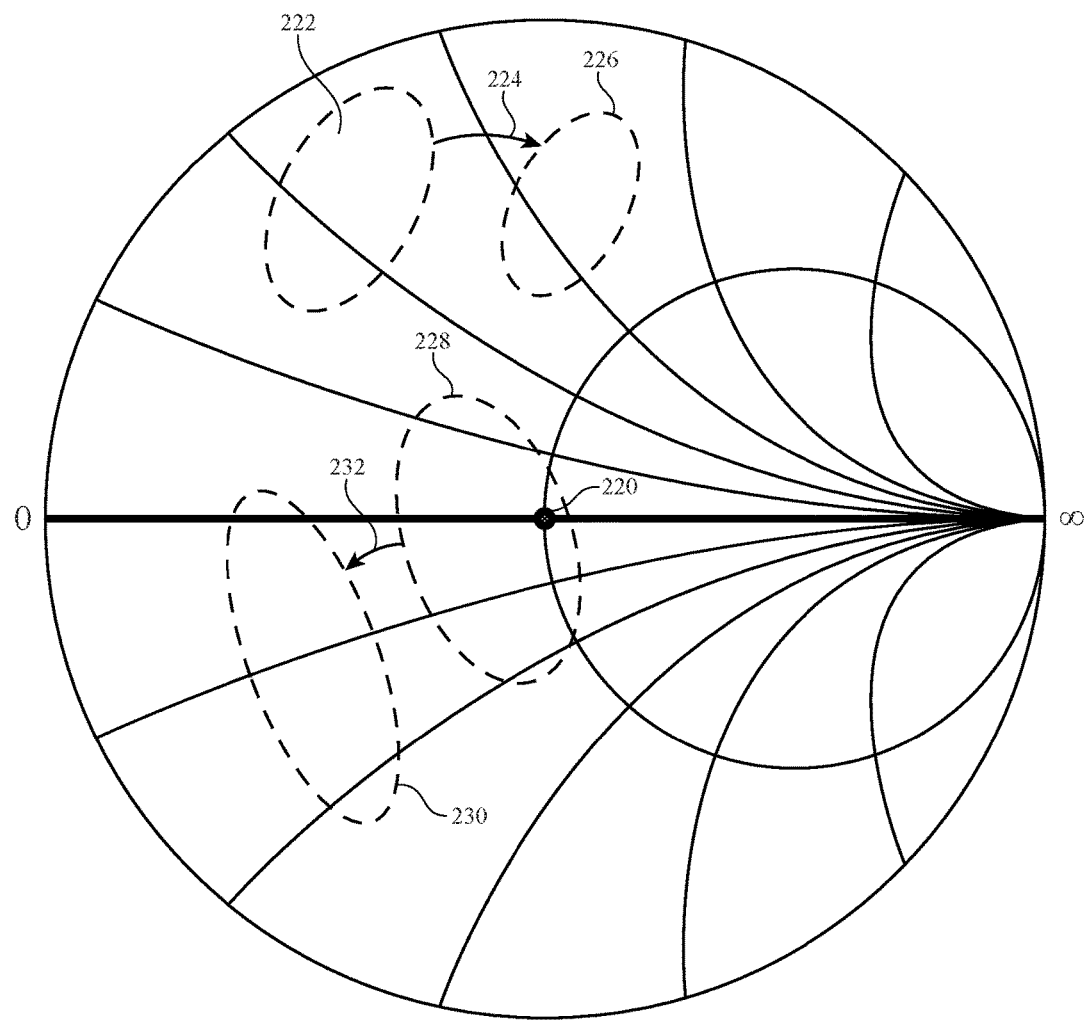
FIG. 7 is a Smith chart showing illustrative impedances associated with operation of an antenna in an electronic device when operated by different groups of users in accordance with an embodiment.

FIG. 7 is a Smith chart showing how switching antenna 40L between the first and second antenna tuning states may affect antenna performance differently between two different groups of users. In the Smith chart of FIG. 7, antenna impedances for lower antenna 40L are measured as a function of different operating conditions. A fifty ohm antenna impedance is characterized by impedance point 220 in the chart of FIG. 7. An antenna with an impedance close to point 220 may be considered well matched to a fifty ohm transmission line in device 10 (e.g., transmission line 92).

Antenna 40L may exhibit an impedance within region 222 of FIG. 7 when tuned to the free-space tuning setting while device 10 is being held by a first group of users (e.g., users who hold or tend to hold device 10 at the bottom of housing 12 as shown in environments 204 and 208 of FIG. 6). Region 222 is relatively far from point 220, indicating a relatively high level of antenna detuning. In order to compensate for this detuning, control circuitry 30 may control tuning circuitry 106 to tune antenna 40L to the grip tuning setting as shown by arrow 224. After being tuned to the grip tuning setting, antenna 40L may exhibit an impedance within region 226. Region 226 is closer to point 220 than region 222, indicating a lower level of antenna detuning than when operated under the free-space tuning setting associated with region 222. In this way, control circuitry 30 may compensate for the detuning of lower antenna 40L caused by the hand of users in the first group.

However, antenna 40L may exhibit different impedances in the grip and free-space tuning settings when held by the second group of users (e.g., users who hold or tend to hold device 10 along the middle of housing 12 as shown in environments 206 and 202 of FIG. 6). For example, antenna 40L may exhibit an impedance within region 228 when tuned to the free-space tuning setting while device 10 is being held by the second group of users. Region 228 is very close to point 220, indicating a relatively low (e.g., negligible) level of antenna detuning.

If antenna 40L were to be blindly adjusted to the grip tuning settings in this scenario (e.g., because control circuitry 30 may still detect that a user is holding device 10), the impedance of antenna 40L would shift to region 230 as shown by arrow 232. However, region 230 is farther away from point 220 than region 228, indicating that antenna 40L would be more significantly detuned if such an adjustment were to be made while device 10 is being held by the second group of users. It would therefore be desirable for device 10 to be able to compensate for detuning of antenna 40L regardless of which group of users is operating device 10 (e.g., regardless of how the user holds the device), while also ensuring that regulations on energy absorption by the user are satisfied.

The example of FIGS. 6 and 7 is merely illustrative. In general, device 10 may be operated in any desired number of different operating environments. For example, device 10 may be placed on a user's leg or in a user's pocket. The user may hold device 10 in other positions, with a different hand, with both hands, or in any other desired manner. Each operating environment may affect the antenna impedance ways other than as shown in FIG. 7. In general, there may be any desired number of groups of users that use device 10 who may affect antenna performance differently. Care must be taken when adjusting antenna 40L to ensure that detuning is mitigated for antenna 40L regardless of the group of user that uses device 10.

Control circuitry 30 may control the maximum transmit power level of antennas 40 in order to ensure that device 10 satisfies regulations on energy absorption regardless of the operating environment and operating state of device 10. FIG. 8 shows a table 240 of different maximum transmit power level settings that may be imposed on antennas 40 by control circuitry 30. Table 240 may, for example, be stored on storage circuitry associated with controller 30.

As shown in FIG. 8, control circuitry 30 may impose maximum transmit power levels P1, P2, P3, and P4 on antennas 40. Maximum power level P1 may be a maximum power level for lower antenna 40L when device 10 is in the vicinity of a user's head (e.g., in environments 202 and 204 of FIG. 6). Maximum power level P1 may therefore sometimes be referred to herein as lower antenna head power level P1. Maximum power level P2 may be a maximum power level for lower antenna 40L when device 10 is not in the vicinity of the user's head (e.g., in environments 208 and 206). If desired, maximum power level P2 may be used when device 10 is adjacent to a part of the user's body other than the user's head (e.g., the user's hand, leg, etc.). Maximum power level P2 may therefore sometimes be referred to herein as lower antenna body power level P2. If desired, when operating in free-space environment 200 of FIG. 6, the higher of power levels P1 and P2 may be imposed on lower antenna 40L and the higher of power levels P3 and P4 may be imposed on upper antenna 40U.

In one suitable arrangement, lower antenna head power level P1 may be greater than lower antenna body power level P2. When control circuitry 30 determines that device 10 is adjacent to a user's head or in free-space environment 200, control circuitry 30 may impose maximum power level P1 on lower antenna 40L. Otherwise (e.g., when control circuitry 30 determines that device 10 is adjacent to other parts of the user's body), control circuitry 30 may impose maximum power level P2 on lower antenna 40L.

Maximum power level P3 may be a maximum power level for upper antenna 40U when device 10 is in the vicinity of a user's head (e.g., as in environments 202 and 204). Maximum power level P3 may therefore sometimes be referred to herein as upper antenna head power level P3. Maximum power level P4 may be a maximum power level for upper antenna 40U when device 10 is not in the vicinity of the user's head (e.g., in environments 208 and 206). If desired, maximum power level P4 may be used when device 10 is adjacent to a part of the user's body other than the user's head (e.g., the user's hand, leg, etc.). Maximum power level P4 may therefore sometimes be referred to herein as upper antenna body power level P4.

Upper antenna head power level P3 may be lower than upper antenna body power level P4. When control circuitry 30 determines that device 10 is adjacent to a user's head, control circuitry 30 may impose maximum power level P3 on upper antenna 40U. Otherwise, control circuitry 30 may impose maximum power level P4 on upper antenna 40U.

The example of FIG. 8 is merely illustrative. Lower antenna body power level P2 may be less than, greater than, or equal to upper antenna head power level P3. If desired, lower antenna head power level P1 may be greater than lower antenna body power P2 (e.g., because the bottom side of device 10 may still be held sufficiently far away from the user's head when the user holds device 10 to their head). In general, any desired number of maximum transmit power levels may be imposed on upper antenna 40U and lower antenna 40L (e.g., three maximum power levels, four maximum power levels, more than four maximum power levels, etc.). Similar maximum power levels may be imposed on other antennas 40 within device 10 if desired.

Control circuitry 30 may control the tuning of antennas 40U and 40L in order to ensure that the antennas operate properly in both the presence and absence of external objects such as a user's head or hand. Antenna 40U and antenna 40L may each have two respective tuning settings so that antennas 40U and 40L collectively exhibit four different tuning settings, for example.

Figure 9:
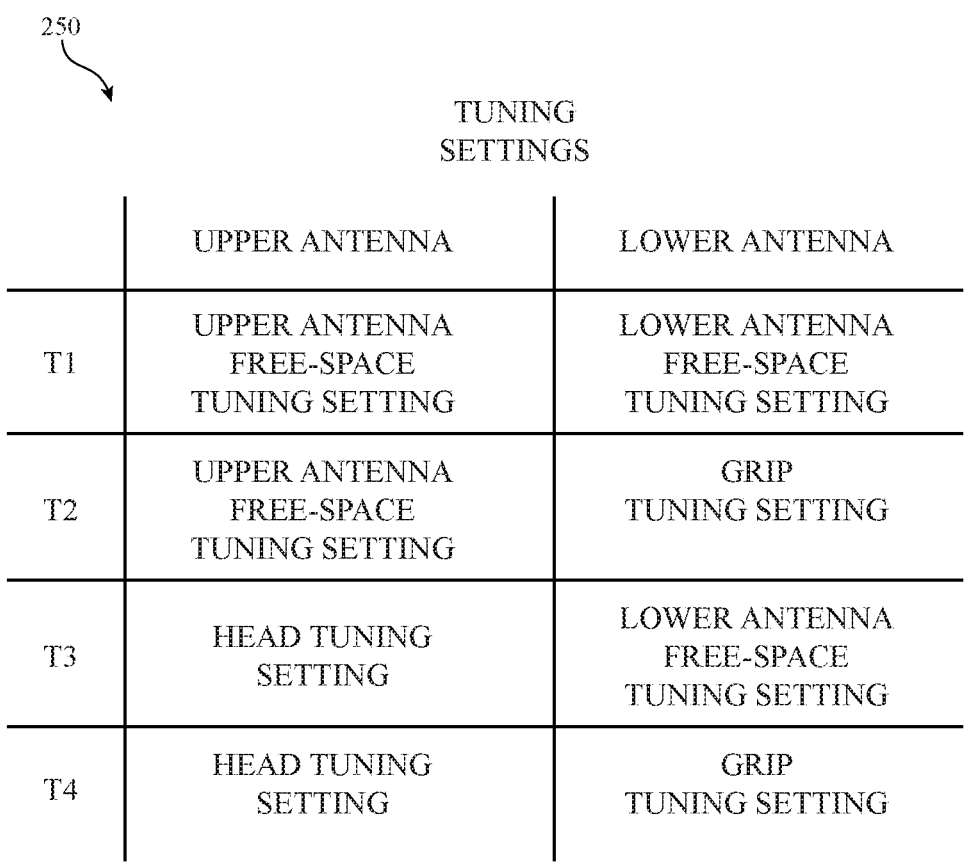
FIG. 9 is a table of illustrative antenna tuning settings that may be stored on an electronic device for use during wireless communications in accordance with an embodiment.

FIG. 9 shows a table 250 of different tuning settings (states) of antennas 40U and 40L that may be controlled by control circuitry 30. Table 250 may, for example, be stored on storage circuitry associated with controller 30.

As shown in FIG. 9, lower antenna 40L may have a grip tuning setting and a free-space tuning setting. Upper antenna 40U may have two settings such as a free-space tuning setting and a head tuning setting. Control circuitry 30 may, for example, configure upper antenna 40U using the head tuning setting when device 10 is being held adjacent to the user's head. The head tuning setting of upper antenna 40U may mitigate any detuning of upper antenna 40U caused by loading of antenna 40U by the user's head. Control circuitry 30 may configure upper antenna 40U using the upper antenna free-space tuning setting when device 10 is not being held to a user's head. Control circuitry 30 may adjust the tuning setting of upper antenna 40U by, for example, controlling switching circuitry in tuning circuits such as tuning circuits 106 coupled to upper antenna 40U.

In scenarios where upper antenna 40U and lower antenna 40L each have two tuning settings, antennas 40U and 40L may collectively have four different tuning states T1, T2, T3, and T4. Control circuitry 30 may place device 10 in first tuning state T1 by applying the upper antenna free-space tuning setting to antenna 40U and the lower antenna free-space tuning setting to lower antenna 40L. Control circuitry 30 may place device 10 in first tuning state T1 when device 10 is located in free space environment 200 of FIG. 6, for example.

Control circuitry 30 may place device 10 in second tuning state T2 by applying the upper antenna free-space tuning setting to upper antenna 40U and the grip tuning setting to lower antenna 40L. Control circuitry 30 may place device 10 in third tuning state T3 by applying the head tuning setting to upper antenna 40U and the lower antenna free-space tuning setting to lower antenna 40L. Control circuitry may place device 10 in fourth tuning state T4 by applying the head tuning setting to upper antenna 40U and the grip tuning setting to lower antenna 40L.

The example of FIG. 9 is merely illustrative. In general, each antenna 40 may have any desired number of tuning settings or states (e.g., antenna 40L may have one tuning setting, two tuning settings, three tuning settings, four tuning settings, more than four tuning settings, etc.). If desired, upper antenna 40U may have a different number of tuning settings than lower antenna 40L.

Control circuitry 30 may process information about the operating environment of device 10 and the operating state of device 10 to select appropriate tuning settings (e.g., tuning settings such as those in table 250 of FIG. 9) and maximum transmit power level settings (e.g., settings such as those shown in table 240 of FIG. 9) for antennas 40. Control circuitry 30 may, for example, operate in a closed loop manner to actively update the tuning settings based on continuously or semi-continuously gathered impedance information associated with antenna 40L.

Figure 10:
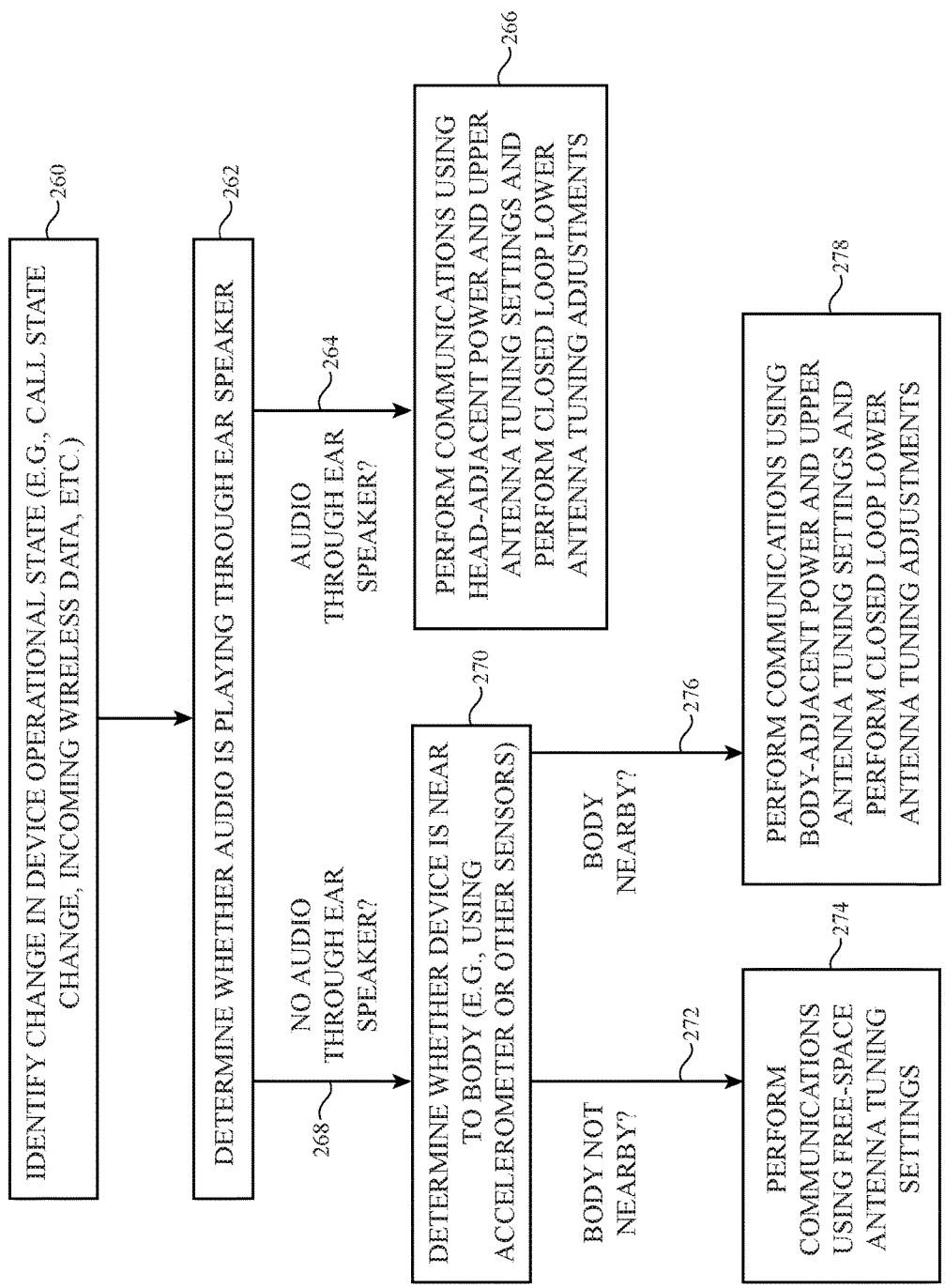
FIG. 10 is a flow chart of illustrative steps involved in adjusting antenna tuning settings and maximum transmit power level settings while performing wireless communications using an electronic device in accordance with an embodiment.

FIG. 10 is a flow chart of illustrative steps that may be performed by device 10 to adjust antenna tuning and maximum transmit power level settings for antennas 40 while performing wireless communications operations.

At step 260, control circuitry 30 may identify a change in the operational state of device 10 (e.g., any desired change in device state that may require adjustment to antennas 40 to ensure satisfactory antenna performance and compliance with absorption regulations). For example, control circuitry 30 may identify that a telephone call has been received, that a user of device 10 is using device 10 to browse the internet, send email, send a text message, etc. In general, control circuitry 30 may identify any desired triggering condition associated with the operation of device 10.

At step 262, control circuitry 30 may determine whether audio is being played through ear speaker 26 (FIG. 1). Audio being played through ear speaker 26 may be, for example, an indication that device 10 is being held up to the ear of a user (e.g., so that the user can hear the audio being played from the ear speaker, as shown in scenarios 202 and 204 of FIG. 6). If audio is being played through ear speaker 26, processing may proceed to step 266 as shown by path 264.

At step 266, control circuitry 30 may control upper antenna 40U and lower antenna 40L to perform wireless communications using head-adjacent maximum transmit power level settings. For example, control circuitry 30 may impose maximum transmit power level P1 on lower antenna 40L and may impose maximum transmit power level P3 on upper antenna 40U (FIG. 8). This may help to ensure that the amount of radio-frequency signals absorbed by the user's head is limited, thereby ensuring that energy absorption regulations are satisfied.

Control circuitry 30 may set upper antenna 40U to a first upper antenna tuning setting such as the upper antenna head tuning setting (e.g., as shown in FIG. 9). This may mitigate any detuning of upper antenna 40U caused by the presence of a user's head adjacent to upper antenna 40U (e.g., as may be required to hear audio through ear speaker 26). Control circuitry 30 may set and actively update the tuning settings of lower antenna 40L based on real time measurements of the impedance of antenna 40L (e.g., using closed loop tuning adjustments).

If no audio is being played through ear speaker 26, processing may proceed to step 270 as shown by path 268. This may, for example, occur if device 10 is being used in a speakerphone mode (e.g., if audio is being played from speakers on device 10 other than ear speaker 26), if the user of device 10 is using device 10 to browse the internet, send email, interact with software applications, etc.

At step 270, control circuitry 30 may determine whether device 10 is near to (adjacent to) or in contact with a body (e.g., the body of the user of device 10). For example, control circuitry 30 may use sensors 168 or accelerometer 170 to identify when device 10 is currently on the body of a user. As an example, accelerometer 170 may measure motion signals that are processed by control circuitry 30. Control circuitry 30 may determine that device 10 is on the body of the user when the measured motion signals have a frequency that is characteristic of device 10 being on the body of the user (e.g., being held by the user, placed on the body of the user, in a pocket of the user, etc.). Control circuitry 30 may determine that device 10 is not on the body of the user when the measured motion signals do not have this characteristic frequency. When device 10 is next to the body of the user, antennas 40 may need to be limited and tuned differently than when device 10 is not near the user's body.

If control circuitry 30 determines that device 10 is near to a body (e.g., on, in contact with, or adjacent to the body of the user), processing may proceed to step 278 as shown by path 276. At step 278, control circuitry 30 may control upper antenna 40U and lower antenna 40L to perform wireless communications using body-adjacent maximum transmit power level settings. For example, control circuitry 30 may impose maximum transmit power level P2 on lower antenna 40L and may impose maximum transmit power level P4 on upper antenna 40U (FIG. 8). This may help to ensure that the amount of radio-frequency signals absorbed by the user's body is limited, thereby ensuring that energy absorption regulations are satisfied.

Control circuitry 30 may set upper antenna 40U to a second upper antenna tuning setting such as the upper antenna free-space tuning setting shown in FIG. 9. Control circuitry 30 may set and actively update the tuning setting of lower antenna 40L based on real time measurements of the impedance of antenna 40L (e.g., using closed loop tuning adjustments).

If control circuitry 30 determines that device 10 is not near to a body, processing may proceed to step 274 as shown by path 272. At step 274, control circuitry 30 may control upper antenna 40U and lower antenna 40L to perform wireless communications using free-space antenna tuning settings. For example, control circuitry 30 may place antennas 40U and 40L in tuning state T1 of FIG. 9 (e.g., so that upper antenna 40U conveys radio-frequency signals using the upper antenna free-space tuning setting and lower antenna 40L conveys radio-frequency signals using the lower antenna free-space tuning setting).

If desired, the steps of FIG. 10 may be repeated or halted when device 10 changes its operational state. For example, the steps of FIG. 10 may be halted or repeated when the telephone call is ended, when the user stops browsing the internet using device 10, when radio-frequency data is no longer being conveyed to a base station, etc. In general, the steps of FIG. 10 may be performed whenever data needs to be transmitted and/or received using antennas 40. In this way, the tuning and maximum transmit power levels of antennas 40 may be updated as needed to ensure that satisfactory wireless communication is performed without violating any signal absorption regulations.

Figure 11:
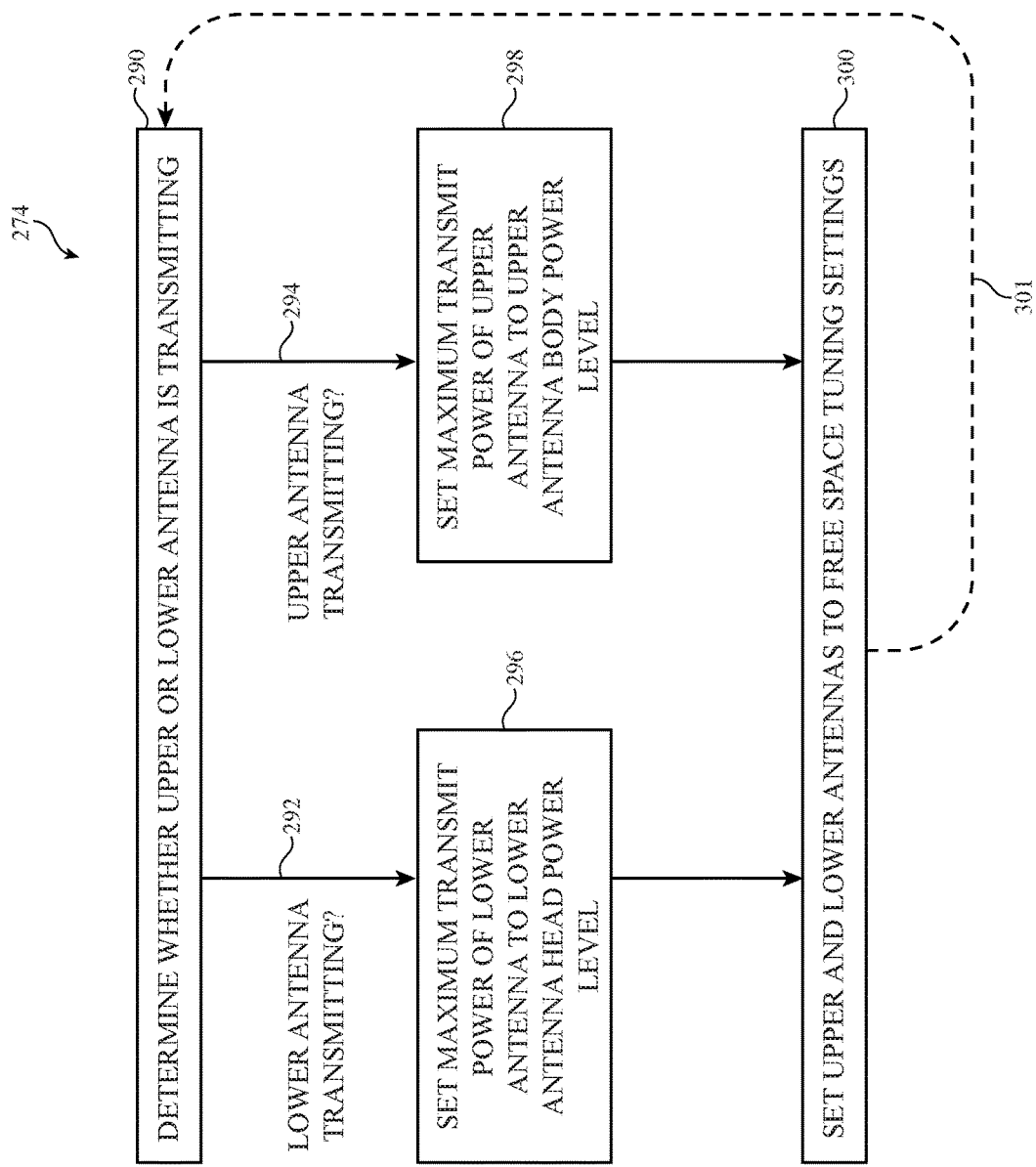
FIG. 11 is a flow chart of illustrative steps involved in performing wireless communications using an electronic device while the electronic device is in a free-space operating environment in accordance with an embodiment.

FIG. 11 is a flow chart of illustrative steps that may be performed by control circuitry 30 to control antennas 40 when device 10 is in a free-space environment. The steps of FIG. 11 may, for example, be performed while processing step 274 of FIG. 10 (e.g., while device 10 is in a free-space or static device environment as shown by environment 200 of FIG. 6).

At step 290, control circuitry 30 may determine whether upper antenna 40U or lower antenna 40L is transmitting radio-frequency signals. For example, antennas 40 may be configured so that only a given one of antennas 40L and 40U is transmitting radio-frequency signals at a given time. One of the antennas may receive radio-frequency signals while the other antenna transmits radio-frequency signals if desired. The maximum transmit power level and tuning settings that are used for antennas 40 may depend on which of the antennas is currently being used for transmission.

If upper antenna 40U is being used for transmission, processing may proceed to step 298 as shown by path 294. At step 298, control circuitry 30 may set the maximum transmit power level of upper antenna 40U to upper antenna body power level P4 (FIG. 8). In another suitable arrangement, control circuitry 30 may impose a different maximum transmit power level or may not impose any maximum power level on antenna 40U. Transmission at relatively high power level P4 may ensure that a satisfactory wireless link quality is maintained for antenna 40U. Signal transmission in this configuration may still satisfy regulations on signal absorption because antenna 40U is not adjacent to the user's body. Processing may subsequently proceed to step 300.

If lower antenna 40L is being used for transmission, processing may proceed to step 296 as shown by path 292. At step 296, control circuitry 30 may set the maximum transmit power level of lower antenna 40L to lower antenna head power level P1. In another suitable arrangement, control circuitry 30 may impose a different maximum transmit power level on antenna 40L or may not impose any maximum power level on antenna 40L. Signal transmission in this configuration may still satisfy regulations on signal absorption because antenna 40L is not adjacent to the user's body. Processing may subsequently proceed to step 300.

At step 300, control circuitry 30 may set antennas 40 to free-space tuning state T1. For example, control circuitry 30 may set lower antenna 40L to the lower antenna free-space tuning setting and may set upper antenna 40U to the upper antenna free-space tuning setting. When operating in tuning state T1, antennas 40 may convey radio-frequency signals with high efficiency and without any detuning due to the presence of external objects (e.g., because antennas 40 are well matched to a free-space environment and device 10 is located in a free-space environment in this scenario).

Processing may loop back to step 290 as shown by optional path 301, if desired. For example, the steps of FIG. 11 may be repeated if the transmit antenna is changed during communications. The example of FIG. 11 is merely illustrative. If desired, step 300 may be performed prior to or concurrently with steps 296 and 298.

Figure 12:
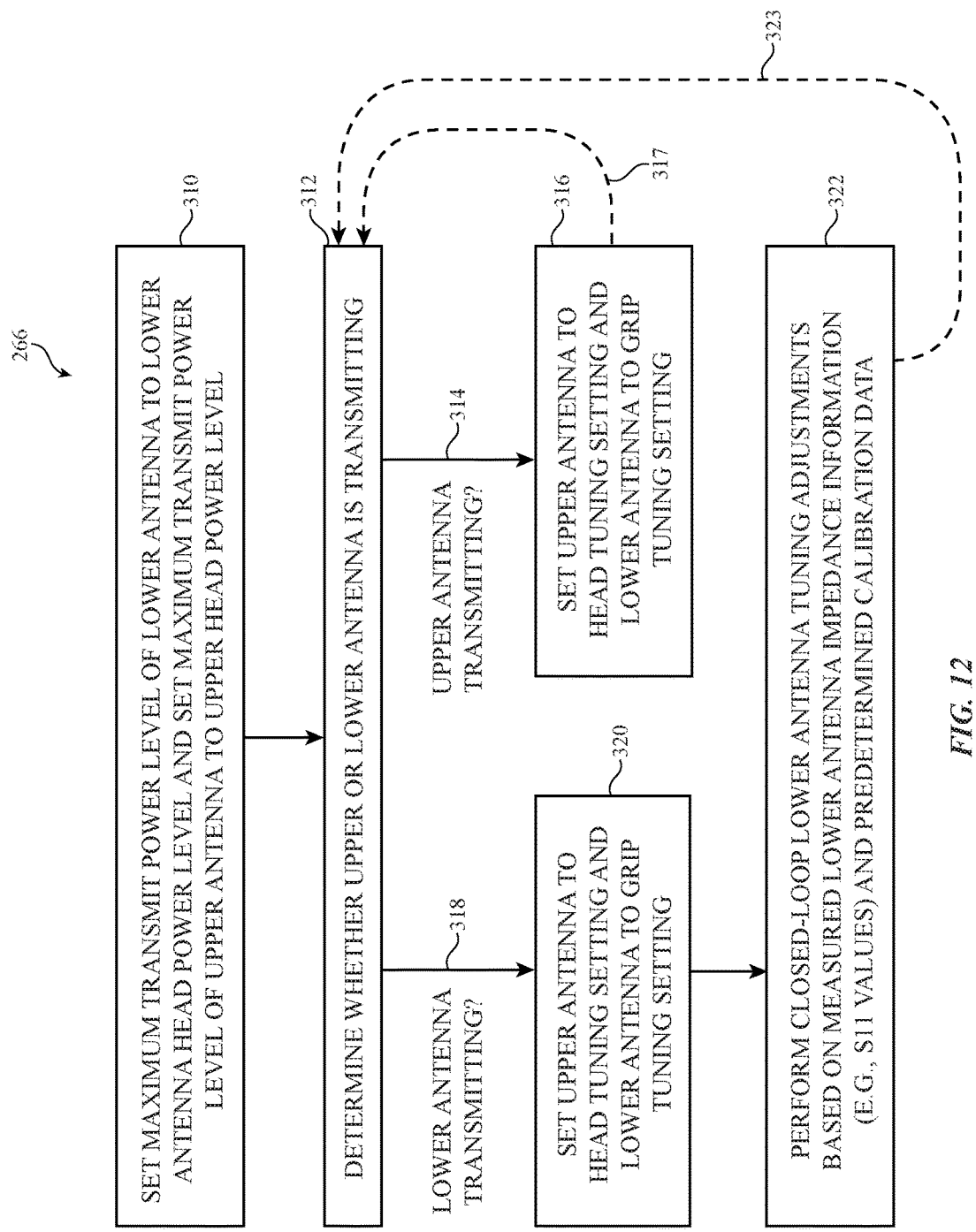
FIG. 12 is a flow chart of illustrative steps that may be performed by an electronic device to adjust maximum transmit power level and antenna tuning settings during wireless communications while the electronic device is located near to a user's head in accordance with an embodiment.

FIG. 12 is a flow chart of illustrative steps that may be performed by control circuitry 30 to control antennas 40 when device 10 is determined to be in the vicinity of a user's head. The steps of FIG. 12 may, for example, be performed while processing step 266 of FIG. 10 (e.g., while device 10 is being held by a user to their head as shown in environments 202 or 204 of FIG. 6).

At step 310, control circuitry 30 may set the maximum transmit power level of lower antenna 40L to lower antenna head power level P1. Control circuitry 30 may set the maximum transmit power level of upper antenna 40U to upper antenna head power level P3. By configuring antennas 40 using head transmit power levels P1 and P3, signal absorption by the user's head may be limited, thereby satisfying signal absorption regulations.

At step 312, device 10 may determine whether upper antenna 40U or lower antenna 40L is being used to transmit radio-frequency signals. If upper antenna 40U is being used to transmit signals, processing may proceed to step 316 as shown by path 314.

At step 316, control circuitry 30 may set upper antenna 40U to the head tuning setting (FIG. 9). This may mitigate any detuning of upper antenna 40U caused by loading of antenna 40U by the user's head. Control circuitry 30 may set lower antenna 40L to the grip tuning setting. This may mitigate any detuning of lower antenna 40L caused by the user holding device 10 up to their head (e.g., so that reception of radio-frequency signals over lower antenna 40L is satisfactory). In other words, control circuitry 30 may place antennas 40 in tuning state T4 of FIG. 9. If desired, processing may loop back to step 312 as shown by optional path 317 if the transmit antenna changes during communications.

If lower antenna 40L is being used to transmit signals, processing may proceed to step 320 as shown by path 318. At step 320, control circuitry 30 may set upper antenna 40U to the head tuning setting and may set lower antenna 40L to the grip tuning setting (e.g., as reflected by tuning state T4 of FIG. 9). Processing may subsequently proceed to step 322.

At step 322, control circuitry 30 may perform closed-loop tuning adjustments for lower antenna 40L based on impedance information measured from lower antenna 40L and based on predetermined calibration data stored on device 10. For example, control circuitry 30 may actively gather phase and magnitude information in the form of complex S11 values using signals routed by coupler 164 (FIG. 4) during communications.

Control circuitry 30 may process the actively gathered S11 values to determine whether the tuning setting of antenna 40L needs to be updated (e.g., to compensate for any change in the operating environment of device 10). By updating the tuning settings of antenna 40L using the gathered S11 values, control circuitry 30 may ensure that any detuning of lower antenna 40L is mitigated during communications regardless of changes in the operating environment of device 10.

For example, by initially setting antenna 40L to the grip tuning setting at step 320, control circuitry 30 initially assumes that the user potentially belongs to the group of users that holds the device 10 along the bottom side of housing 12 (e.g., as shown in scenarios 208 and 204 of FIG. 6). However, the closed loop tuning adjustments may allow control circuitry 30 to actively determine if the user actually belongs to that group of users or if the user belongs to the group of users that holds the phone elsewhere on housing 12 (e.g., as shown in scenarios 202 and 206). In this way, control circuitry 30 may actively perform the appropriate tuning adjustments (or lack thereof) for antenna 40L to mitigate any potential detuning regardless of how the user holds the device. The closed loop tuning adjustments may allow control circuitry 30 to update the tuning adjustments if the user changes how they are holding device 10 over time. Processing may loop back to step 312 as shown by optional path 323, if desired. For example, steps 312-322 may be repeated if the transmit antenna is changed during communications.

Figure 13:
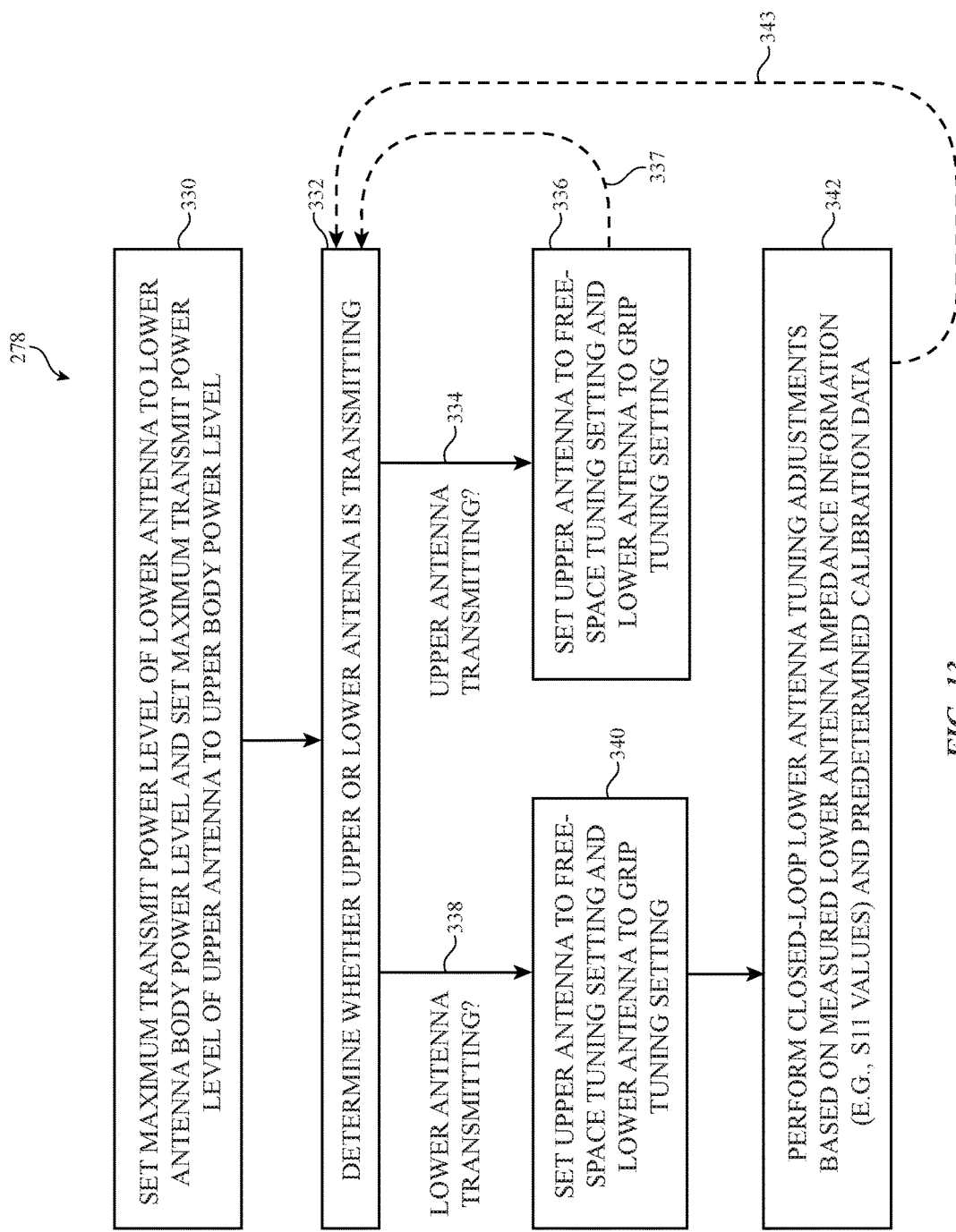
FIG. 13 is a flow chart of illustrative steps that may be performed by an electronic device to adjust maximum transmit power level and antenna tuning settings during wireless communications using while the electronic device is located near to a user's body in accordance with an embodiment.

FIG. 13 is a flow chart of illustrative steps that may be performed by control circuitry 30 to control antennas 40 when device 10 is determined to be in the vicinity of a body. The steps of FIG. 13 may, for example, be performed while processing step 278 of FIG. 10 (e.g., while device 10 is being held by a user but not near their head, such as is in operating environments 208 or 206 of FIG. 6).

At step 330, control circuitry 30 may set the maximum transmit power level of lower antenna 40L to lower antenna body power level P2. Control circuitry 30 may set the maximum transmit power level of upper antenna 40U to upper antenna body power level P4. By configuring antennas 40 using body transmit power levels P2 and P4, a high quality wireless link can be established without violating signal absorption regulations.

At step 332, device 10 may determine whether upper antenna 40U or lower antenna 40L is being used to transmit radio-frequency signals. If upper antenna 40U is transmitting signals, processing may proceed to step 336 as shown by path 334.

At step 336, control circuitry 30 may set upper antenna 40U to the free-space tuning setting (e.g., because users do not typically hold device 10 by the top half of housing 12, so antenna 40U may effectively operate in a free-space environment). Control circuitry 30 may set lower antenna 40L to the grip tuning setting. This may mitigate any detuning of lower antenna 40L caused by the user holding device 10 (e.g., so that reception of radio-frequency signals over lower antenna 40L is satisfactory). In other words, control circuitry 30 may place antennas 40 in tuning state T2 of FIG. 9. If the transmit antenna changes during communications, processing may loop back to step 332 as shown by optional path 337, if desired.

If lower antenna 40L is transmitting signals, processing may proceed to step 340 as shown by path 338. At step 340, control circuitry 30 may set upper antenna 40U to the free-space tuning setting and may set lower antenna 40L to the grip tuning setting (e.g., as shown by tuning state T2 of FIG. 9). Processing may subsequently proceed to step 342.

At step 342, control circuitry 30 may perform closed-loop tuning adjustments for lower antenna 40L based on impedance information measured from lower antenna 40L and based on predetermined calibration data stored on device 10. For example, control circuitry 30 may actively gather phase and magnitude information in the form of complex S11 values from coupler 164 during communications.

Control circuitry 30 may process the gathered S11 values to determine whether the tuning setting of antenna 40L needs to be updated (e.g., to compensate for any change in the operating environment of device 10). By updating the tuning settings of antenna 40L using the gathered S11 values, control circuitry 30 may ensure that any detuning of lower antenna 40L is mitigated during communications regardless of changes in the operating environment of device 10. Processing may loop back to step 332 as shown by optional path 337, if desired. For example, steps 332-342 may be repeated if the transmit antenna is changed during communications.

Figure 14:
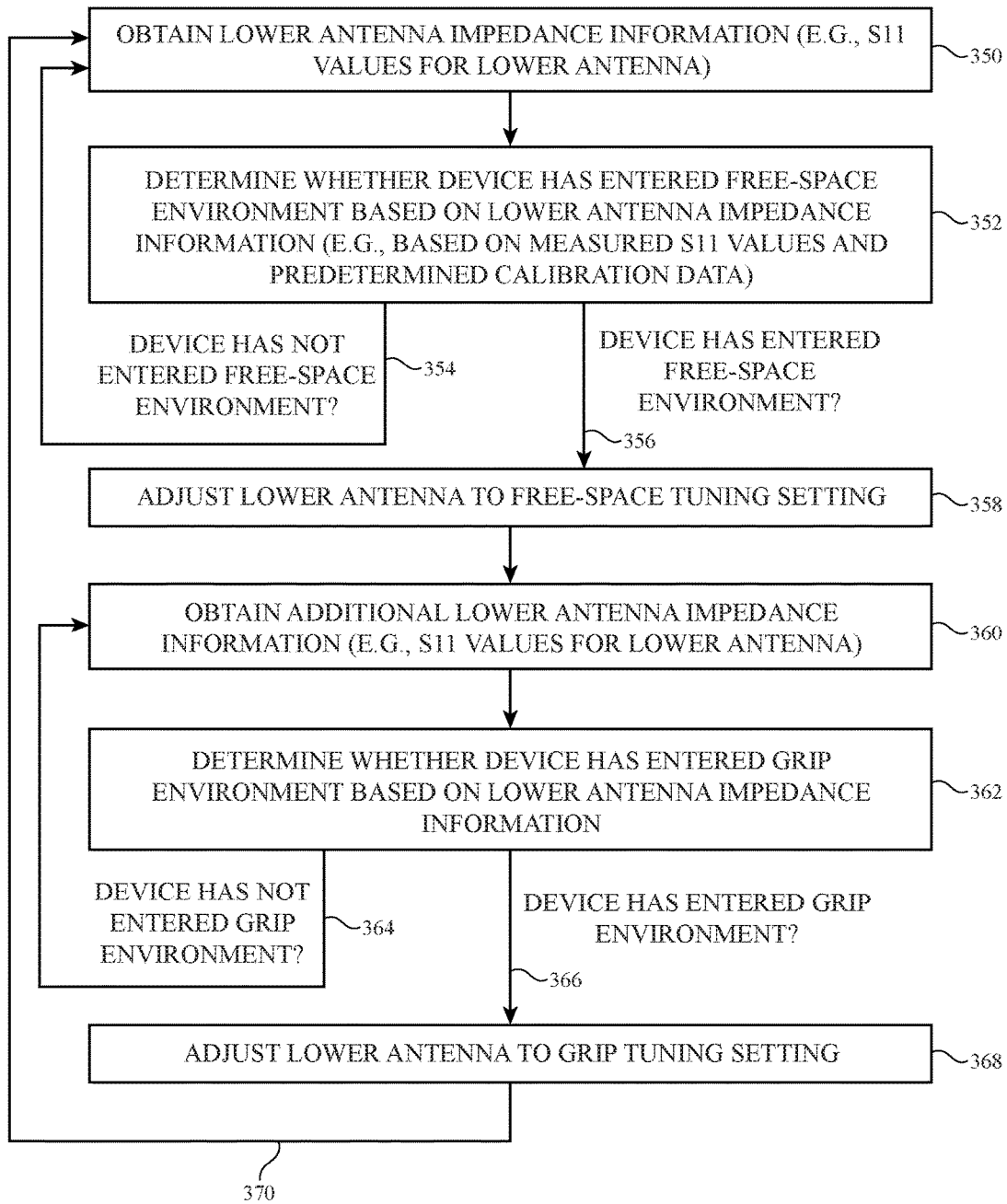
FIG. 14 is a flow chart of illustrative steps involved in using an electronic device to perform closed loop antenna tuning adjustments during wireless communications in accordance with an embodiment.

FIG. 14 is a flow chart of illustrative steps that may be processed by control circuitry 30 to perform closed-loop tuning adjustments on lower antenna 40L (e.g., based on impedance information measured using lower antenna 40L and predetermined calibration data stored on device 10). The steps of FIG. 14 may, for example, be performed by control circuitry 30 while processing step 322 of FIG. 12 or step 342 of FIG. 13.

At step 350, control circuitry 30 may obtain antenna impedance information from lower antenna 40L. For example, control circuitry 30 may measure phase and magnitude information from signals transmitted on transmission line 92 and from reflected versions of the transmitted signals that are received via coupler 164 (FIG. 4). Control circuitry 30 may obtain complex impedance values such as S11 values from the measured phase and magnitude information.

Control circuitry 30 may measure any desired number of S11 values at step 350. For example, control circuitry 30 may measure a single S11 value, two S11 values, three or more S11 values, etc. If desired, control circuitry 30 may perform S11 measurements at regular updating time intervals (e.g., every 10 ms, every 1 second, every 10 seconds, etc.). If desired, control circuitry 30 may combine multiple S11 values to generate a final S11 value that is used for subsequent processing. For example, control circuitry 30 may generate the final S11 value as a linear combination or average of any desired number of measured S11 values. Performing more S11 measurements may increase the reliability of the final S11 measurement at the expense of increasing processing time.

At step 352, control circuitry 30 may process the gathered lower antenna impedance information to determine whether antenna 40L has entered a free-space environment. For example, control circuitry 30 may compare the S11 values (or the final S11 value in scenarios where multiple S11 measurements are performed at step 350) to predetermined calibration data to determine whether antenna 40L has entered the free-space environment.

If control circuitry 30 determines that device 10 has not entered a free-space environment, processing may loop back to step 350 as shown by path 354 to continue to gather additional S11 values. For example, if device 10 remains in an environment such as environment 208 or 206 of FIG. 6, the S11 values obtained by control circuitry 30 may indicate that device 10 has not yet entered a free-space environment.

If control circuitry 30 determines that device 10 has entered a free-space environment, processing may proceed to step 358 as shown by path 356. For example, if device 10 enters environment 200 from environments 208 or 206 of FIG. 6, the S11 values obtained by control circuitry 30 may indicate that device 10 (or at least lower antenna 40L) has entered a free-space environment. Entering the free-space environment may cause an impedance mismatch at antenna 40L that detunes antenna 40L, which was previously set to the grip tuning setting (e.g., at step 320 of FIG. 12 or step 340 of FIG. 13).

At step 358, control circuitry 30 may adjust lower antenna 40L to the lower antenna free-space tuning setting. For example, circuitry 30 may place antennas 40 in tuning state T3 (FIG. 9) in scenarios where the steps of FIG. 14 are performed while processing step 322 of FIG. 12. Circuitry 30 may place antennas 40 in tuning state T1 in scenarios where the steps of FIG. 14 are performed while processing step 342 of FIG. 13. Adjusting lower antenna 40L may ensure that lower antenna 40L is well matched to the environment surrounding antenna 40L, thereby mitigating any antenna detuning that would have been caused by the antenna being set to the grip tuning setting in a free-space environment (e.g., so that reception of radio-frequency signals over lower antenna 40L is satisfactory).

Antenna 40L may continue to transmit signals using the free-space tuning setting. If desired, control circuitry 30 may concurrently obtain additional antenna impedance information from lower antenna 40L. For example, control circuitry 30 may gather additional S11 values from lower antenna 40L.

Control circuitry 30 may measure any desired number of S11 values at step 360. For example, control circuitry 30 may measure a single S11 value, two S11 values, three or more S11 values, etc. If desired, control circuitry 30 may perform S11 measurements at regular time intervals (e.g., every 10 seconds, every 1 second, etc.). If desired, control circuitry 30 may combine multiple S11 values to generate a final S11 value that is used for subsequent processing. For example, control circuitry 30 may generate the final S11 value as a linear combination or average of any desired number of S11 values. Control circuitry 30 may gather the same number of S11 values as when performing step 350 or may gather a different number of S11 values than when performing step 350.

At step 362, control circuitry 30 may process the gathered additional impedance information to determine whether antenna 40L has returned to a grip environment (e.g., an environment in which the user is holding device 10 or in which the user's body is otherwise adjacent to antenna 40L). For example, control circuitry 30 may compare the measured additional S11 values (or the final S11 value in scenarios where multiple S11 measurements are performed at step 360) to predetermined calibration data to determine whether antenna 40L has entered the grip environment.

If control circuitry 30 determines that device 10 has not returned to the grip environment, processing may loop back to step 360 as shown by path 364 to continue to gather additional S11 values. For example, if device 10 remains in an environment such as environment 200 of FIG. 6 or another environment in which the user's hand is not adjacent to lower antenna 40L, the additional S11 values obtained by control circuitry 30 may indicate that device 10 has not yet returned to the grip environment.

If control circuitry 30 determines that device 10 has returned to the grip environment, processing may proceed to step 368 as shown by path 366. For example, if device 10 enters environment 208 or 206 from environments 200 of FIG. 6, the S11 values obtained by control circuitry 30 may indicate that device 10 (or at least lower antenna 40L) has returned to the grip environment. Entering the grip environment may detune antenna 40L, which was previously set to the free-space tuning setting (e.g., at step 358).

At step 368, control circuitry 30 may adjust lower antenna 40L to the grip tuning setting. For example, circuitry 30 may place antennas 40 in tuning state T4 (FIG. 9) in scenarios where the steps of FIG. 14 are performed while processing step 322 of FIG. 12. Circuitry 30 may place antennas 40 in tuning state T2 in scenarios where the steps of FIG. 14 are performed while processing step 342 of FIG. 13. Adjusting lower antenna 40L may ensure that lower antenna 40L is well matched to the environment surrounding antenna 40L, thereby mitigating any antenna detuning that would have been caused by the antenna being set to the free-space tuning setting in a grip environment (e.g., so that reception of radio-frequency signals over lower antenna 40L is satisfactory).

Processing may subsequently loop back to step 350 to obtain additional impedance measurements and update the tuning settings of lower antenna 40L as necessary. If audio is played through ear speaker 26 at any time while processing the steps of FIG. 11 or FIG. 13, processing may, if desired, jump to step 266 of FIG. 10. For example, when a user switches from speaker phone mode to ear speaker mode during a telephone call, processing may be updated to perform head-adjacent power and antenna tuning adjustment operations. If audio stops being played through ear speaker 26 at any time while processing the steps of FIG. 11, processing may, if desired, jump to step 270 of FIG. 10. For example, when a user switches from ear speaker mode to speaker phone mode during a telephone call, processing may be updated to perform body-adjacent or free-space antenna tuning and power adjustment operations. If the operational state of device 10 changes (e.g., if the call is ended) during processing of the steps of FIGS. 10-14, the processing operations of FIGS. 10-14 may halt or processing may return to step 260, if desired.

In this way, control circuitry 30 may perform closed-loop tuning adjustments (e.g., by looping back to steps 350 and 360 to continually and actively updating tuning based on S11 measurements over time). This is in contrast with open loop processing in which control circuitry 30 adjusts antennas 40 using only settings that are stored in look up tables on device 10.

By performing closed-loop antenna adjustments in this way, antenna 40L can be actively adjusted based on the current operating environment so that the antenna is provided with proper tuning regardless of the group of users that is operating antenna 40 (e.g., regardless of whether the user holds the device as shown in environments 208 and 204 or as shown in environments 206 and 202 of FIG. 6). In other words, performing these operations may allow control circuitry 30 to adjust the impedance of antenna 40L from region 222 to region 226 for users that hold device 10 as shown in scenarios 208 and 204 without adjusting the impedance of antenna 40L from region 228 to region 230 for users that hold device 10 as shown in scenarios 206 and 202.

If desired, steps 332-342 of FIG. 13 and steps 312-322 of FIG. 12 may be omitted if the desired transmit power level for antennas 40 drops below a threshold transmit power level. For example, a cellular base station or other access point equipment may instruct device 10 to operate at a transmit power level that is below the threshold (e.g., if link quality is satisfactory enough so that transmit power may be limited without affecting call quality). In these scenarios, it may not be necessary to perform closed loop antenna tuning adjustment operations. In addition, measurement of S11 values may, in practice, become less reliable at transmit power levels below the threshold level. Omission of such processing steps may therefore prevent any unreliable measurement of S11 in such a scenario, for example.

If desired, control circuitry 30 may additionally or alternatively perform open-loop antenna tuning and maximum transmit power adjustment operations using lookup tables. For example, control circuitry 30 may perform open loop look up table operations to determine antenna settings to use for changes in carrier frequency, handover operations, measurement gap operations, paging operations, or any other desired operations.

Figure 15:
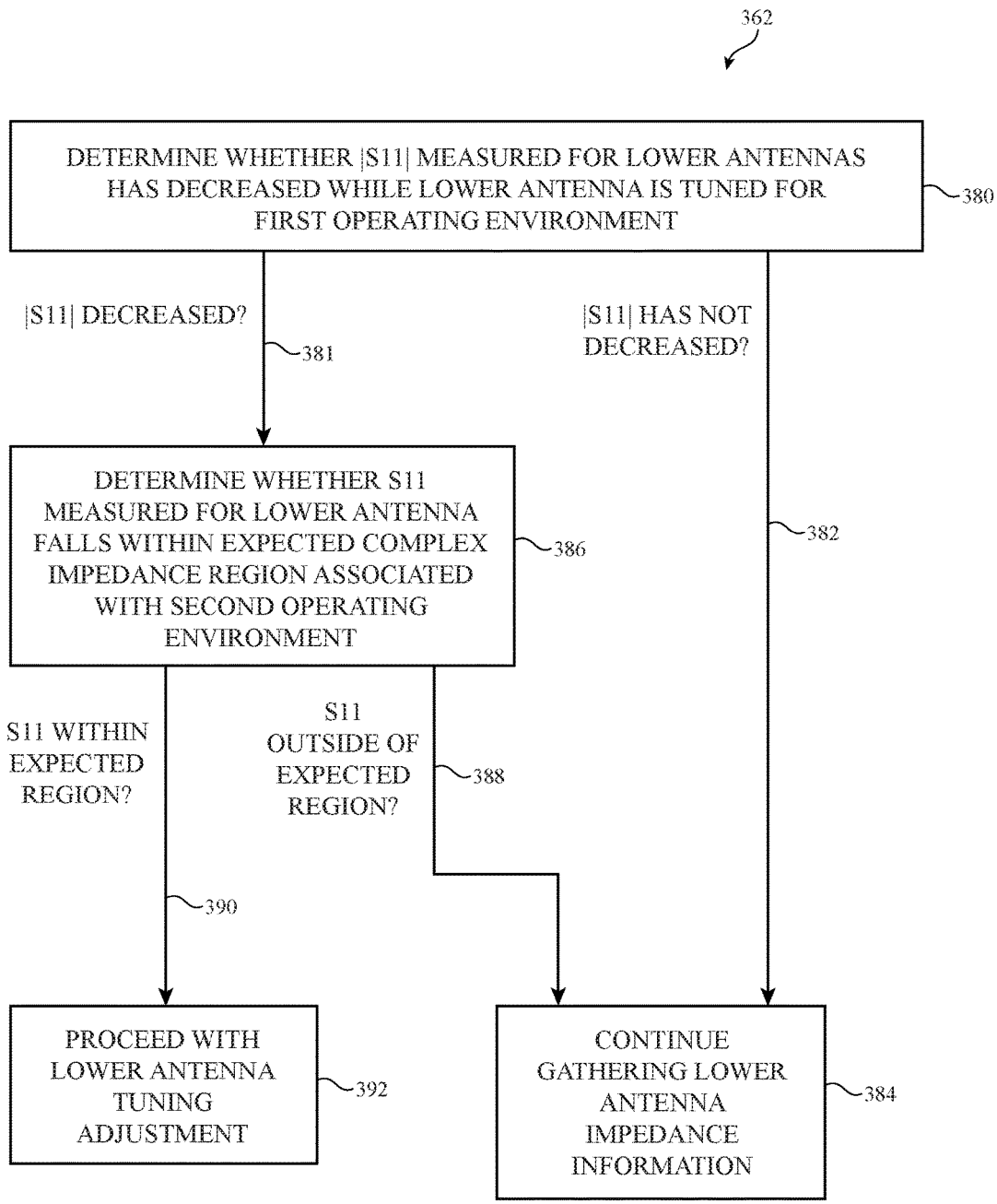
FIG. 15 is a flow chart of illustrative steps that may be performed by an electronic device to determine when to change antenna tuning settings based on gathered impedance information in accordance with an embodiment.

FIG. 15 is a flow chart of illustrative steps that may be performed by control circuitry 30 to determine whether lower antenna 40L has changed operating environments (e.g., to a free-space environment from a grip environment or from a grip environment to a free-space environment). The steps of FIG. 15 may, for example, be performed while processing step 352 or 362 of FIG. 14 (e.g., after obtaining a complex S11 value from lower antenna 40L).

At step 380, control circuitry 30 may determine whether the magnitude of the measured S11 value(s) ("|S11|") has decreased while antenna 40L is tuned using a first tuning setting (e.g., using the grip tuning setting while processing step 352 or using the free-space tuning setting while processing step 362).

In scenarios where multiple S11 values are obtained, circuitry 30 may determine whether the magnitude of the final S11 value (e.g., the magnitude of the average of multiple S11 values) has decreased over time. For example, control circuitry 30 may compare the final S11 value to one or more previously-stored S11 measurements made with the current lower antenna tuning setting to determine whether the magnitude of S11 has decreased.

If the magnitude of the final S11 value has not decreased, processing may proceed to step 384 as shown by path 382. At step 384, control circuitry 30 may continue to gather antenna impedance information. In scenarios where the steps of FIG. 15 are performed while processing step 352 of FIG. 14, step 384 may involve looping back to step 350 as shown by path 354 of FIG. 14. In scenarios where the steps of FIG. 15 are performed while processing step 362 of FIG. 14, step 384 may involve looping back to step 360 as shown by path 364 of FIG. 14.

In general, a decrease in the magnitude of S11 may be indicative of fewer reflected signals being received at coupler 164, a better impedance match between lower antenna 40L and its immediate surroundings, and less antenna detuning caused by external objects 162. An increase in the magnitude of S11 (or if the magnitude of S11 is unchanged) may be indicative of more reflected signals being received at coupler 164, a poorer impedance match, and more antenna detuning. By continuing to gather impedance data when the magnitude of S11 has not decreased, control circuitry 30 may ensure that any change in the tuning setting of lower antenna 40L actually improves antenna tuning and performance before changing the tuning setting.

If the magnitude of the final S11 value has decreased, processing may proceed to step 386 as shown by path 381. At step 386, control circuitry 30 may determine whether the final S11 value falls within an expected complex impedance region (e.g., a complex impedance region associated with a free-space environment when antenna 40L is set using the grip tuning setting or a complex impedance region associated with a grip environment when antenna 40L is set using the free-space tuning setting). The boundaries of the expected complex impedance region may vary based on the current tuning settings for antenna 40L and based on the frequency of operation. The boundaries of the expected complex impedance region may be defined by calibration data stored on device 10 (e.g., the boundaries may be predetermined and stored on device 10 during a calibration of device 10).

If the S11 value is outside of the expected complex impedance region, processing may proceed to step 384 and additional S11 data may be gathered. The value of S11 being outside of the expected region may be indicative of lower antenna 40L having not yet changed operating environments. As such, the antenna tuning setting need not be updated.

If the final S11 is within the expected complex impedance region, processing may proceed to step 392 as shown by path 390. At step 392, control circuitry 30 may proceed with the appropriate lower antenna tuning adjustment. For example, in scenarios where step 352 of FIG. 14 is performed, processing may proceed to step 358. In scenarios where step 362 is performed, processing may proceed to step 368 of FIG. 14.

If desired, control circuitry 30 may process multiple S11 measurements at step 386. For example, control circuitry 30 may perform a voting process to determine whether to proceed along path 390 or 388. To perform the voting process, control circuitry 30 may determine whether a predetermined number of S11 measurements agrees or falls within the expected region. For example, control circuitry 30 may advance to step 392 if a predetermined ratio of sequentially measured S11 measurements are the same or if a predetermined ratio of sequentially measured S11 measurements fall within the expected region (e.g., if four out of five S11 measurements are the same or fall within the expected region, if seven out of ten S11 measurements fall within the expected region, etc.). If the predetermined ratio of S11 measurements disagree or do not fall within the expected region, processing may advance to step 384. Performing a voting process during this determination may help to eliminate false positive signals, noise, or other outliers from impacting the decision making performed by control circuitry 30.

If desired, control circuitry 30 may ignore S11 measurements that are excessively old in performing step 386. For example, control circuitry 30 may include a buffer for storing sequentially measured S11 values. Control circuitry 30 may remove S11 measurements from the buffer that are older than a predetermined threshold time (e.g., a so-called "forgetting factor"). This may prevent outdated or inaccurate S11 measurements from affecting the decision making performed by control circuitry 30 at step 386. If recent S11 measurements are not available, antenna tuning adjustments may be omitted or open loop antenna adjustments may be performed, if desired.

Figure 16:
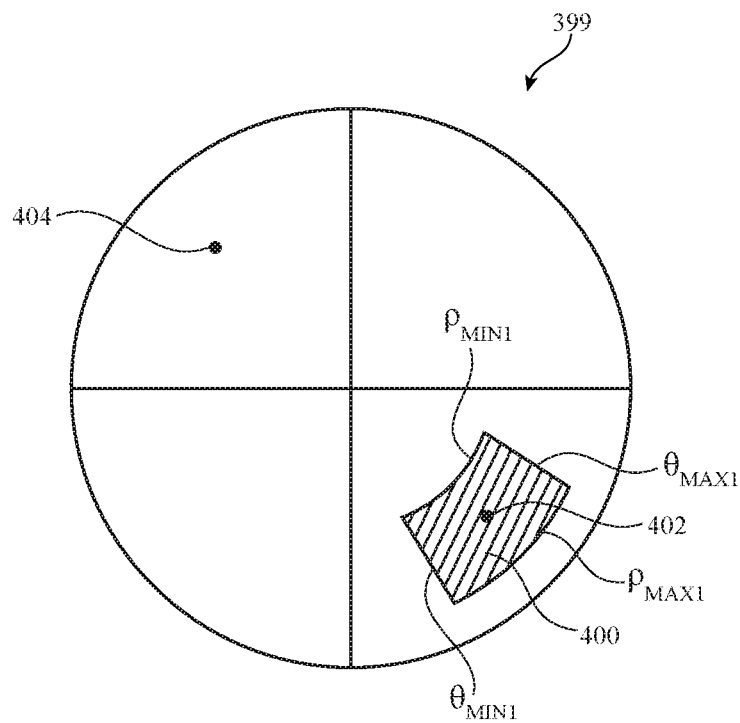
FIG. 16 is a plot of complex impedance values for an illustrative antenna while the antenna is tuned using a free-space tuning setting in accordance with an embodiment.

FIG. 16 shows a plot 399 of complex impedance values (e.g., with the real component of the complex impedance values on the horizontal axis and the imaginary component of the complex impedance values on the vertical axis) for antenna 40L while tuned using the free-space tuning setting. Plot 399 may, for example, be indicative of the impedance of antenna 40L while control circuitry 30 gathers S11 values from antenna 40L when processing step 360 of FIG. 14.

As shown in FIG. 16, calibration data stored on device 10 may identify a free-space complex impedance region 400. Region 400 may be defined by an upper radius threshold $\rho_{MAX1}$, a lower radius threshold $\rho_{MIN1}$, a lower angular threshold $\theta_{MIN1}$, and an upper angular threshold $\theta_{MIN2}$. Control circuitry 30 may identify the region of plot 399 outside of region 400 as the expected region while processing step 386 of FIG. 15.

If the measured S11 value falls within the expected region, such as at point 404, control circuitry 30 may determine that the measured S11 value is within the expected region and the tuning of lower antenna 40L may be adjusted to the grip tuning setting (e.g., as shown by step 392 of FIG. 15 and step 368 of FIG. 14). An S11 value at point 404 may, for example, be indicative of a user holding device 10 as shown in scenarios 208 and 204 of FIG. 6 (e.g., a user from a group of users that hold device 10 along the bottom of housing 12).

If the measured S11 value falls outside of the expected region, such as at point 402, control circuitry 30 may determine that the measured S11 value is outside of the expected region and circuitry 30 may continue to gather impedance information using the free-space tuning setting for lower antenna 40L (e.g., as shown by step 384 of FIG. 15 and loop 364 of FIG. 14). An S11 value at point 402 may, for example, be indicative of a user holding device 10 as shown in scenarios 206 and 202 of FIG. 6 (e.g., a user from a group of users that hold device 10 along the middle of housing 12).

Figure 17:
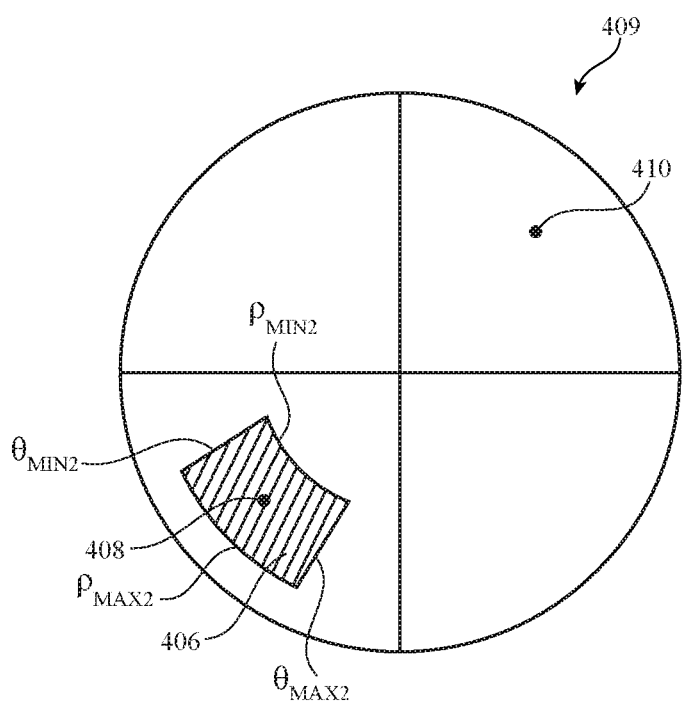
FIG. 17 is a plot of complex impedance values for an illustrative antenna while the antenna is tuned using a grip tuning setting in accordance with an embodiment.

FIG. 17 shows a plot 409 of complex impedance values for antenna 40L while tuned using the grip tuning setting. Plot 409 may, for example, be indicative of the antenna impedance of antenna 40L while control circuitry 30 gathers S11 values from antenna 40L when processing step 352 of FIG. 14.

As shown in FIG. 17, calibration data stored on device 10 may identify a free-space complex impedance region 406.

Region 406 may be defined by an upper radius threshold $\rho_{MAX2}$, a lower radius threshold $\rho_{MIN2}$, a lower angular threshold $\theta_{MIN2}$, and an upper angular threshold $\theta_{MAX2}$. Control circuitry 30 may identify region 406 of plot 409 as the expected region while processing step 386 of FIG. 15, for example.

If the measured S11 value falls within the expected region, such as at point 408, control circuitry 30 may determine that the measured S11 value is within the expected region and the tuning of lower antenna 40L may be adjusted to the free-space tuning setting. An S11 value at point 408 may, for example, be indicative of a user holding device 10 as shown in scenarios 206 and 202 of FIG. 6 (e.g., a user from a group of users that hold device 10 along the middle of housing 12).

If the measured S11 value falls outside of the expected region, such as at point 410, control circuitry 30 may determine that the measured S11 value is outside of the expected region and circuitry 30 may continue to gather impedance information using the grip tuning setting for lower antenna 40L. An S11 value at point 408 may, for example, be indicative of a user holding device 10 as shown in scenarios 208 and 204 of FIG. 6 (e.g., a user from a group of users that hold device 10 along the bottom of housing 12).

In the example of FIGS. 16 and 17, S11 values 404 and 410 may be gathered for the group of users that hold device 10 along the bottom of housing 12, whereas S11 values 410 and 408 are gathered for the group of users that hold device 10 along the middle of housing 12. By performing the operations of FIGS. 10-15, adjustments of antenna 40L from impedance region 228 to impedance region 230 of FIG. 7 may be avoided, whereas adjustments of antenna 40L from region 222 to 226 are performed. This may mitigate detuning of antenna 40L for the group of users that hold device 10 along the bottom of housing 12 without detuning antenna 40L for the group of users that hold device 10 along the middle of housing 12.

The example of FIGS. 16 and 17 are merely illustrative. In general, regions 400 and 406 may be located at any desired location in plots 399 and 409, respectively. Regions 400 and 406 may have any desired shape (e.g., as determined by factory or design calibration of device 10). Regions 400 and 406 may be defined by any desired boundaries. If desired, plots 399 and 409 may each have multiple continuous and/or discontinuous regions 400.

Figure 18:
FIG. 18 is a table of illustrative calibration data that may be stored on an electronic device and processed to determine when to change antenna tuning settings in accordance with an embodiment.

FIG. 18 is a table of calibration data that may be stored on device 10 for determining when to adjust tuning settings for lower antenna 40L. As shown in FIG. 18, table 420 may store threshold values $\rho_{MAX1}$, $\rho_{MIN1}$, $\theta_{MAX1}$, and $\theta_{MIN1}$ defining free-space region 400 when antenna 40L is set to the free-space tuning setting (FIG. 16). Table 420 may also store threshold values $\rho_{MAX2}$, $\rho_{MIN2}$, $\theta_{MAX2}$, and $\theta_{MIN2}$ defining free-space region 406 when antenna 40L is set to the grip tuning setting (FIG. 17).

Table 420 may store different values of these thresholds (e.g., $\rho_1$, $\rho_2$, $\theta_1$, $\theta_2$, etc.) for different operating frequencies F of antenna 40L (e.g., a first frequency F1, a second frequency F2, etc.). This may allow different regions to be defined for different frequencies of operation (e.g., because antenna impedance of antenna 40L may be dependent upon the operating frequency). Control circuitry 30 may select the appropriate row of table 420 for use in comparing with measured S11 values (e.g., while processing step 386 of FIG. 15) based on the operating frequency of antenna 40L.

If desired, steps 312-322 of FIG. 12 and steps 332-342 of FIG. 13 may be omitted for some frequencies of operation (e.g., closed loop antenna tuning may be performed for some frequencies of operation and may be omitted for other frequencies of operation). As an example, control circuitry 30 may perform closed loop tuning of lower antenna 40L when operating at a low band cellular telephone frequency such as between 700 and 960 MHz whereas circuitry 30 performs open loop adjustments at midband cellular telephone frequencies between 1710 and 2170 MHz and high band cellular telephone frequencies between 2300 and 2700 MHz. In this example, lower antenna 40L may be particularly susceptible to detuning due to the presence of the user's hand at frequencies between 700 and 960 MHz and less susceptible at other frequencies. Calibration data 420 for these frequencies may be omitted if desired.

The example of FIGS. 10-18 described in connection with upper and lower antennas 40U and 40L is merely illustrative. If desired, the methods of FIGS. 10-18 may be extended to any number of antennas placed at any desired locations on device 10.

These threshold values may be loaded onto device 10 before normal operation of device 10 by an end user of device 10. For example, these values may be generated during design or factory calibration of device 10. Table 420 may include data stored in any desired format or data structure.

The foregoing is merely illustrative and various modifications can be made by those skilled in the art without departing from the scope and spirit of the described embodiments. The foregoing embodiments may be implemented individually or in any combination.

What is claimed is:

1. A method of adjusting an antenna in an electronic device having opposing first and second ends and comprising an ear speaker located at the first end of the electronic device and the antenna is located at the second end of the electronic device, the method comprising:
    with control circuitry in the electronic device, determining whether the ear speaker is playing audio signals;
    with the control circuitry, determining whether the electronic device is located on a body based on sensor signals generated by sensor circuitry in the electronic device and at least partly in response to determining that the ear speaker is not playing audio signals;
    with the control circuitry, controlling the antenna to transmit radio-frequency signals below a maximum transmit power level and adjusting a tunable component to tune the antenna to a first tuning setting in response to determining that the electronic device is located on the body;
    with the control circuitry, gathering a first set of antenna impedance information from the antenna while the antenna is tuned to the first tuning setting;
    with the control circuitry, determining whether an operating environment of the electronic device has changed based on the first set of antenna impedance information;
    with the control circuitry, in response to determining that the operating environment has changed, adjusting the tunable component to tune the antenna to a second tuning setting and gathering a second set of antenna impedance information from the antenna while the antenna is tuned to the second tuning setting; and
    with the control circuitry, in response to determining that the operating environment has not changed, gathering a third set of antenna impedance information from the antenna while the antenna is tuned to the first tuning setting.

2. The method defined in claim 1, wherein the first tuning setting is a grip tuning setting that compensates for detuning of the antenna generated by presence of a hand adjacent to the antenna and the second tuning setting is a free-space tuning setting that is different from the grip tuning setting.

3. The method defined in claim 1, wherein determining whether the operating environment of the electronic device has changed comprises determining whether the electronic device has entered a second operating environment from a first operating environment based on the first set of antenna impedance information, the method further comprising:
    with the control circuitry, determining whether the electronic device has entered the first operating environment from the second operating environment based on the second set of antenna impedance information.

4. The method defined in claim 3, further comprising:
    with the control circuitry, in response to determining that the electronic device has entered the first operating environment from the second operating environment, adjusting the tunable component to tune the antenna to the first tuning setting and gathering a fourth set of antenna impedance information from the antenna while the antenna is tuned to the first tuning setting.

5. The method defined in claim 1, wherein the first set of antenna impedance information comprises a complex impedance value and determining whether the operating environment of the electronic device has changed comprises:
    identifying boundaries of a complex impedance region from data stored on the electronic device; and
    determining whether the complex impedance value lies within the identified complex impedance region by comparing the complex impedance value to the identified boundaries of the complex impedance region.

6. The method defined in claim 5, wherein determining whether the operating environment of the electronic device has changed further comprises:
    in response to determining that the complex impedance value lies within the complex impedance region, determining that the operating environment of the electronic device has changed; and
    in response to determining that the complex impedance value lies outside of the complex impedance region, determining that the operating environment of the electronic device has not changed.

7. The method defined in claim 1, wherein gathering the first set of antenna impedance information from the antenna while the antenna is tuned to the first tuning setting comprises:
    receiving reflected radio-frequency signals from the antenna over a radio-frequency coupler; and
    generating a set of complex scattering parameter values based on the received reflected radio-frequency signals.

8. The method defined in claim 7, wherein gathering the first set of antenna impedance information from the antenna while the antenna is tuned to the first tuning setting further comprises:
    averaging a plurality of complex scattering parameter values in the set of complex scattering parameter values to generate an average complex scattering parameter value, wherein determining whether the operating environment of the electronic device has changed based on the first set of antenna impedance information comprises determining whether the operating environment of the electronic device has changed based on the generated average complex scattering parameter value.

9. The method defined in claim 7, wherein the generated set of complex scattering parameter values comprises a plurality of complex scattering parameter values and determining whether the operating environment of the electronic device has changed based on the first set of antenna impedance information comprises performing a voting operation on the plurality of complex scattering parameter values.

10. The method defined in claim 7, wherein determining whether the operating environment of the electronic device has changed based on the first set of antenna impedance information comprises:
   determining whether magnitudes of complex scattering parameter values in the set of complex scattering parameter values have decreased over time; and
   in response to determining that the magnitudes have not decreased over time, determining that the operating environment of the electronic device has not changed.

11. A method of adjusting an antenna in an electronic device, the method comprising:
   with control circuitry in the electronic device, adjusting a tunable component to tune the antenna to a first tuning setting;
   with the control circuitry, gathering a first set of antenna impedance information from the antenna while the antenna is tuned to the first tuning setting, wherein gathering the first set of antenna impedance information from the antenna while the antenna is tuned to the first tuning setting comprises:
      receiving reflected radio-frequency signals from the antenna over a radio-frequency coupler; and
      generating a set of complex scattering parameter values based on the received reflected radio-frequency signals;
   with the control circuitry, determining whether an operating environment of the electronic device has changed based on the first set of antenna impedance information;
   with the control circuitry, in response to determining that the operating environment has changed, adjusting the tunable component to tune the antenna to a second tuning setting and gathering a second set of antenna impedance information from the antenna while the antenna is tuned to the second tuning setting; and
   with the control circuitry, in response to determining that the operating environment has not changed, gathering a third set of antenna impedance information from the antenna while the antenna is tuned to the first tuning setting.

12. The method defined in claim 11, wherein gathering the first set of antenna impedance information from the antenna while the antenna is tuned to the first tuning setting further comprises:
   averaging a plurality of complex scattering parameter values in the set of complex scattering parameter values to generate an average complex scattering parameter value, wherein determining whether the operating environment of the electronic device has changed based on the first set of antenna impedance information comprises determining whether the operating environment of the electronic device has changed based on the generated average complex scattering parameter value.

13. The method defined in claim 11, wherein the generated set of complex scattering parameter values comprises a plurality of complex scattering parameter values and determining whether the operating environment of the electronic device has changed based on the first set of antenna impedance information comprises performing a voting operation on the plurality of complex scattering parameter values.

14. The method defined in claim 11, wherein determining whether the operating environment of the electronic device has changed based on the first set of antenna impedance information comprises:
   determining whether magnitudes of complex scattering parameter values in the set of complex scattering parameter values have decreased over time; and
   in response to determining that the magnitudes have not decreased over time, determining that the operating environment of the electronic device has not changed.

15. The method defined in claim 14, wherein determining whether the operating environment of the electronic device has changed based on the first set of antenna impedance information further comprises:
   in response to determining that the magnitudes have decreased over time, determining whether the set of complex scattering parameter values lies within a predetermined complex impedance region;
   in response to determining that the set of complex scattering parameter values lies within the predetermined complex impedance region, determining that the operating environment of the electronic device has changed; and
   in response to determining that the set of complex scattering parameter values lies outside of the predetermined complex impedance region, determining that the operating environment of the electronic device has not changed.

16. A method of adjusting an antenna in an electronic device, the method comprising:
   with control circuitry in the electronic device, adjusting a tunable component to tune the antenna to a first tuning setting;
   with the control circuitry, gathering a first set of antenna impedance information from the antenna while the antenna is tuned to the first tuning setting;
   with the control circuitry, determining whether an operating environment of the electronic device has changed based on the first set of antenna impedance information, wherein determining whether the operating environment of the electronic device has changed comprises determining whether the electronic device has entered a second operating environment from a first operating environment based on the first set of antenna impedance information;
   with the control circuitry, in response to determining that the operating environment has changed, adjusting the tunable component to tune the antenna to a second tuning setting and gathering a second set of antenna impedance information from the antenna while the antenna is tuned to the second tuning setting; and
   with the control circuitry, in response to determining that the operating environment has not changed, gathering a third set of antenna impedance information from the antenna while the antenna is tuned to the first tuning setting;
   with the control circuitry, determining whether the electronic device has entered the first operating environment from the second operating environment based on the second set of antenna impedance information; and
   with the control circuitry, in response to determining that the electronic device has entered the first operating environment from the second operating environment, adjusting the tunable component to tune the antenna to the first tuning setting and gathering a fourth set of antenna impedance information from the antenna while the antenna is tuned to the first tuning setting.

17. The method defined in claim 16, further comprising: with the control circuitry, in response to determining that the electronic device has not entered the first operating environment from the second operating environment, gathering a fifth set of antenna impedance information while the antenna is tuned to the second antenna tuning setting.

* * * * *